US012748213B2

(12) United States Patent
Lee

(10) Patent No.: US 12,748,213 B2
(45) Date of Patent: Sep. 29, 2026

(54) LONGITUDINAL BIAS CORRECTION IN AUTONOMOUS VEHICLES

(71) Applicant: Aurora Operations, Inc., Pittsburgh, PA (US)

(72) Inventor: Dung-Han Lee, Baltimore, MD (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 217 days.

(21) Appl. No.: 18/797,012

(22) Filed: Aug. 7, 2024

(65) Prior Publication Data

US 2026/0043922 A1 Feb. 12, 2026

(51) Int. Cl.

*G01S 17/931* (2020.01)
*B60W 60/00* (2020.01)
*G01S 7/481* (2006.01)
*G01S 17/89* (2020.01)

(52) U.S. Cl.

CPC ......... *G01S 17/931* (2020.01); *B60W 60/001* (2020.02); *G01S 7/4817* (2013.01); *G01S 17/89* (2013.01); *B60W 2420/408* (2024.01); *B60W 2556/40* (2020.02)

(58) Field of Classification Search

CPC ...... G01S 17/931; G01S 7/4817; G01S 17/89; B60W 60/001; B60W 2556/40; B60W 2420/408

See application file for complete search history.

(56) References Cited

U.S. PATENT DOCUMENTS

| | | | | |
|---|---|---|---|---|
| 11,541,903 | B2 * | 1/2023 | Hernandez Esteban | G06T 7/77 |
| 11,544,167 | B2 * | 1/2023 | Manivasagam | G01S 7/497 |
| 12,025,752 | B2 * | 7/2024 | Gupta | G01S 7/497 |
| 12,298,400 | B2 * | 5/2025 | Hu | G01S 17/18 |
| 12,361,686 | B1 * | 7/2025 | Mahieu | G01S 17/89 |
| 12,607,751 | B2 * | 4/2026 | Braley | G01S 7/497 |

* cited by examiner

*Primary Examiner* — Gregory M Desire

(74) *Attorney, Agent, or Firm* — Dority & Manning, P.A

(57) ABSTRACT

An example method includes obtaining a LIDAR scan including a plurality of LIDAR points. The LIDAR scan being descriptive of an environment of an autonomous vehicle. The method includes obtaining a surfel map descriptive of the environment. The surfel map includes a plurality of surfels. The method includes classifying each of the plurality of LIDAR points as an explained LIDAR point or an unexplained LIDAR point based on an alignment of the LIDAR scan to the surfel map, wherein an explained LIDAR point is a LIDAR point that matches a surfel in the surfel map. The method includes shifting the LIDAR scan along a longitudinal direction for a plurality of iterations. The method includes determining a longitudinal bias for each of the plurality of iterations. The method includes performing an operation for the autonomous vehicle based on the longitudinal bias.

20 Claims, 15 Drawing Sheets

LONGITUDINAL BIAS CORRECTION IN AUTONOMOUS VEHICLES

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

An autonomous vehicle can navigate through the use of a pose estimation system. Autonomous vehicle control system(s) (e.g., located at least partially onboard an autonomous vehicle) can receive inputs that facilitate mapping of the autonomous vehicle's environment or localization of the autonomous vehicle relative to the environment. For instance, the autonomous vehicle control system can capture sensor data from sensors (e.g., LIDAR sensors) observing the environment of the autonomous vehicle. The autonomous vehicle control system can also receive map data indicative of known terrain, structures, etc., motion data from an inertial measurement unit (IMU) onboard the vehicle, wheel rotation data from wheel encoders, localization data from, for example, a global navigational satellite system, or other suitable inputs. The autonomous vehicles can perceive its environment or localize itself in its environment through this data.

The present application is directed to correction of longitudinal bias in LIDAR systems of autonomous vehicles. Longitudinal bias can occur when a LIDAR scan is offset from previous LIDAR scans in a direction of travel of the autonomous vehicle (or the opposite direction). As an example, LIDAR points in the LIDAR scan may be aligned ahead or behind an accurate location of those points in comparison to the existing data to which they are aligned. Longitudinal bias can result from an inaccurate transform between a previous coordinate frame and a current coordinate frame, latent GPS data, inaccurate initialization data, conflicting information from other sensor inputs, or other causes. In particular, the present disclosure provides systems and methods for detecting and correcting for longitudinal bias in LIDAR systems onboard autonomous vehicles. The detection of longitudinal bias can inform discarding data for biased timestamps, rebooting the LIDAR system or other modules (e.g., after multiple concurrent detections) and/or correction of biased data, in some instances.

According to the present disclosure, a current LIDAR scan depicting an environment of an autonomous vehicle can be compared to an existing surfel map generated from one or more past LIDAR scans of the environment and/or other suitable data to segment the LIDAR scan into one or more explained LIDAR points and one or more unexplained LIDAR points. The explained LIDAR points can generally correspond to a surfel (or "surface element") in the existing surfel map. For instance, the explained LIDAR points may be within a marginal distance of the surfel such that they can be matched by a matching algorithm, such as an iterative closest point (ICP) algorithm. The unexplained LIDAR points may not correspond to an existing surfel. Because the environment generally does not significantly change between LIDAR scans, the unexplained LIDAR points may be indicative of longitudinal bias.

To detect the longitudinal bias, the coordinates of each LIDAR point in the LIDAR scan can be iteratively shifted along the longitudinal direction (e.g., forward and backward along the direction of travel of the autonomous vehicle) over a plurality of iterations to generate a plurality of shifted representations of the LIDAR scan respective to a plurality of steps (e.g., distance steps), each having a different offset from the original orientation of the LIDAR scan corresponding to the different iterations. For instance, the explained points and the unexplained points can be shifted along the longitudinal direction by some multiple of a step size respective to each shifted representation (e.g., 0.1 cm, 1 cm, 2 cm). At each iteration, the system can determine a number of originally-unexplained points from the original LIDAR scan that can be correlated to an existing surfel after being shifted, and a number of originally-explained points that do not have a corresponding surfel after being shifted. The iteration having a respective shifted representation with a comparatively high ratio of points that are unexplained in the original LIDAR scan and matched to an existing surfel when shifted over the number of points that are explained in the original LIDAR scan and do not have a corresponding surfel when shifted, can "correct" the longitudinal bias. The offset or step size of that iteration can correspond to the longitudinal bias, for instance. In some implementations, the comparison may be weighted based on a vertical component of the existing surfels. For instance, in some instances primarily vertical surfels (e.g., corresponding to signs, walls, etc.) may be more likely to inform longitudinal bias than primarily horizontal surfels (e.g., corresponding to the ground, roads, etc.).

The present disclosure can provide for a number of technical effects and benefits, including improvements to computing technology. As one example, the present disclosure can provide for improved accuracy of localization systems, which can improve the functioning of autonomous vehicles. For instance, the detection and correction of longitudinal bias can provide for the autonomous vehicle to localize itself with greater reliability and accuracy, in turn providing improved capability to accurately reason about its environment and navigate the environment. Additionally or alternatively, the systems and methods of the present disclosure can perform comparisons involving a substantially one-dimensional degree of difference (e.g., the longitudinal direction), which can provide greater efficiency than comparisons involving two-dimensional or three-dimensional components. For instance, the present disclosure can reduce a complex reasoning analysis to a relatively simple shifting operation and matching operation. This can provide for improved suitability for autonomous vehicle operations, which must typically be simultaneously low-latency and accurate.

For example, in an aspect, the present disclosure provides an example computer-implemented method for detecting a longitudinal bias in an autonomy system of an autonomous vehicle. The method includes obtaining a LIDAR scan including a plurality of LIDAR points, the LIDAR scan descriptive of an environment of the autonomous vehicle. The method includes obtaining a surfel map descriptive of the environment of the autonomous vehicle, the surfel map including a plurality of surfels. The method includes classifying each of the plurality of LIDAR points as an explained LIDAR point or an unexplained LIDAR point based on an alignment of the LIDAR scan to the surfel map, wherein an explained LIDAR point is a LIDAR point that matches a surfel in the surfel map. The method includes shifting the LIDAR scan along a longitudinal direction for a plurality of iterations. Each iteration of the plurality of iterations includes: determining a shifted representation of the LIDAR scan; determining a first quantity of shift-explained points, wherein a shift-explained point is an unexplained LIDAR point that matches a surfel in the surfel map in the shifted representation; and determining a second quantity of shift-unexplained points, wherein a shift-unexplained point is an explained LIDAR point that does not match a surfel in the surfel map in the shifted representation. The method includes determining the longitudinal bias by comparing the first quantity to the second quantity for each of the plurality of iterations. The method includes performing an operation for the autonomous vehicle based on the longitudinal bias.

In some implementations, the surfel map is populated based on one or more prior LIDAR scans captured by the autonomous vehicle.

In some implementations, classifying each of the plurality of LIDAR points as an explained LIDAR point or an unexplained LIDAR point includes executing an algorithm that determines the alignment of the LIDAR scan to the surfel map; and classifying a LIDAR point as an explained LIDAR point if the algorithm is successful in matching the LIDAR point to a surfel or classifying the LIDAR point as an unexplained LIDAR point if the algorithm is not successful in matching the LIDAR point to a surfel.

In some implementations, determining the longitudinal bias by comparing the first quantity to the second quantity for each of the plurality of iterations includes identifying a bias-correcting iteration of the plurality of iterations based on a plurality of respective weights of the first quantity of shift-explained points against the second quantity of shift-unexplained points respective to each iteration of the plurality of iterations.

In some implementations, determining the longitudinal bias by comparing the first quantity to the second quantity for each of the plurality of iterations includes determining an iteration of the plurality of iterations having a highest weight of the plurality of respective weights; and identifying the iteration of the plurality of iterations having the highest weight of the plurality of respective weights as the bias-correcting iteration.

In some implementations, performing the operation for the autonomous vehicle includes dropping the LIDAR scan.

In some implementations, performing the operation for the autonomous vehicle includes resetting at least a portion of the autonomy system.

In some implementations, the LIDAR scan is shifted by an offset for each iteration of the plurality of iterations; and performing an operation for the autonomous vehicle includes providing the shifted representation of the LIDAR scan corresponding to the bias-correcting iteration in place of the LIDAR scan, the shifted representation of the LIDAR scan including a plurality of shifted LIDAR points that are shifted by the offset of the bias-correcting iteration.

In some implementations, the shift-explained points are weighted based on verticality of a closest corresponding surfel respective to the shift-explained points, wherein the verticality of the closest corresponding surfel includes a similarity between the longitudinal direction and a normal of the closest corresponding surfel.

In some implementations, the method includes determining that a plane can be fit to at least a majority of the unexplained LIDAR points; and in response to determining that the plane can be fit to at least a majority of the unexplained LIDAR points, performing a second operation to control the autonomous vehicle based on the LIDAR scan without regard to the longitudinal bias.

In some implementations, the method includes determining that a majority of the unexplained LIDAR points fit within a line along a fitted direction, the line including a length that is substantially greater than a width and a height of the line. The method includes determining that the unexplained LIDAR points fitting within the line can be shifted along the fitted direction to match to a surfel of the surfel map. The method includes in response to determining that the unexplained LIDAR points fitting within the line can be shifted along the fitted direction to match to the surfel, performing a second operation to control the autonomous vehicle based on the LIDAR scan without regard to the longitudinal bias.

In some implementations, the method includes determining that a majority of residual vectors between the unexplained LIDAR points and respective corresponding surfels can fit within a plane having a normal substantially aligned with an upward direction of the autonomous vehicle; and in response to determining that a majority of residual vectors between the unexplained LIDAR points and respective corresponding surfels can fit within the plane having the normal substantially aligned with the upward direction of the autonomous vehicle, performing a second operation to control the autonomous vehicle based on the LIDAR scan without regard to the longitudinal bias.

In some implementations, the operation for the autonomous vehicle includes at least one of: (i) determining a pose of the autonomous vehicle in the environment; (ii) determining a motion trajectory for the autonomous vehicle to navigate the environment; (iii) controlling a motion of the autonomous vehicle; or (iv) performing one or more autonomy operations for the autonomous vehicle.

For example, in an aspect, the present disclosure provides an autonomous vehicle (AV) control system. The AV control system includes a LIDAR system configured to provide LIDAR scans; one or more processors; and one or more non-transitory, computer-readable media storing instructions that, when implemented, cause the one or more processors to perform operations. The operations include obtaining a LIDAR scan including a plurality of LIDAR points, the LIDAR scan descriptive of an environment of an autonomous vehicle. The operations include obtaining a surfel map descriptive of the environment of the autonomous vehicle, the surfel map including a plurality of surfels. The operations include classifying each of the plurality of LIDAR points as an explained LIDAR point or an unexplained LIDAR point based on an alignment of the LIDAR scan to the surfel map, wherein an explained LIDAR point is a LIDAR point that matches a surfel in the surfel map. The operations include shifting the LIDAR scan along a longitudinal direction for a plurality of iterations. Each iteration of the plurality of iterations includes determining a shifted representation of the LIDAR scan; determining a first quantity of shift-explained points, wherein a shift-explained point is an unexplained LIDAR point that matches a surfel in the surfel map in the shifted representation; and determining a second quantity of shift-unexplained points, wherein a shift-unexplained point is an explained LIDAR point that does not match a surfel in the surfel map in the shifted representation. The operations include determining a longitudinal bias in the LIDAR system by comparing the first quantity to the second quantity for each of the plurality of iterations. The operations include performing an operation for the autonomous vehicle based on the longitudinal bias.

In some implementations, classifying each of the plurality of LIDAR points as an explained LIDAR point or an unexplained LIDAR point includes executing an algorithm that determines the alignment of the LIDAR scan to the surfel map; and classifying a LIDAR point as an explained LIDAR point if the algorithm is successful in matching the LIDAR point to a surfel or classifying the LIDAR point as an unexplained LIDAR point if the algorithm is not successful in matching the LIDAR point to a surfel.

In some implementations, the determining a longitudinal bias in the LIDAR system by comparing the first quantity to the second quantity for each of the plurality of iterations includes identifying a bias-correcting iteration of the plurality of iterations based on a plurality of respective weights of the first quantity of shift-explained points against the second quantity of shift-unexplained points respective to each iteration of the plurality of iterations.

In some implementations, the LIDAR scan is shifted by an offset for each iteration of the plurality of iterations; performing an operation for the autonomous vehicle includes determining that the respective weight of the bias-correcting iteration is greater than a threshold; and the operations include, in response to determining that the respective weight of the bias-correcting iteration is greater than the threshold, providing the shifted representation of the LIDAR scan corresponding to the bias-correcting iteration in place of the LIDAR scan, the shifted representation of the LIDAR scan including a plurality of shifted LIDAR points that are shifted by the offset of the bias-correcting iteration.

In some implementations, the shift-explained points are weighted based on verticality of a closest corresponding surfel respective to the shift-explained points, wherein the verticality of the closest corresponding surfel includes a similarity between the longitudinal direction and a normal of the closest corresponding surfel.

For example, in an aspect, the present disclosure provides an autonomous vehicle. The autonomous vehicle includes a LIDAR system configured to provide LIDAR scans; one or more processors; and one or more non-transitory, computer-readable media storing instructions that, when implemented, cause the one or more processors to perform operations. The operations include obtaining a LIDAR scan including a plurality of LIDAR points, the LIDAR scan descriptive of an environment of the autonomous vehicle. The operations include obtaining a surfel map descriptive of the environment of the autonomous vehicle, the surfel map including a plurality of surfels. The operations include classifying each of the plurality of LIDAR points as an explained LIDAR point or an unexplained LIDAR point based on an alignment of the LIDAR scan to the surfel map, wherein an explained LIDAR point is a LIDAR point that matches a surfel in the surfel map. The operations include shifting the LIDAR scan along a longitudinal direction for a plurality of iterations. Each iteration of the plurality of iterations includes: determining a shifted representation of the LIDAR scan; determining a first quantity of shift-explained points, wherein a shift-explained point is an unexplained LIDAR point that matches a surfel in the surfel map in the shifted representation; and determining a second quantity of shift-unexplained points, wherein a shift-unexplained point is an explained LIDAR point that does not match a surfel in the surfel map in the shifted representation. The operations include determining longitudinal bias in the LIDAR system by comparing the first quantity to the second quantity for each of the plurality of iterations. The operations include performing an operation for the autonomous vehicle based on the longitudinal bias.

In some implementations, determining the longitudinal bias in the LIDAR system by comparing the first quantity to the second quantity for each of the plurality of iterations includes identifying a bias-correcting iteration of the plurality of iterations based on a plurality of respective weights of the first quantity of shift-explained points to the second quantity of shift-unexplained points respective to each iteration of the plurality of iterations.

Other example aspects of the present disclosure are directed to other systems, methods, vehicles, apparatuses, tangible non-transitory computer-readable media, and devices for localizing an autonomous vehicle.

These and other features, aspects and advantages of various implementations of the present disclosure will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems. As used herein, "about" in conjunction with a stated numerical value is intended to refer to within 20 percent of the stated numerical value, except where otherwise indicated.

Figure 1:
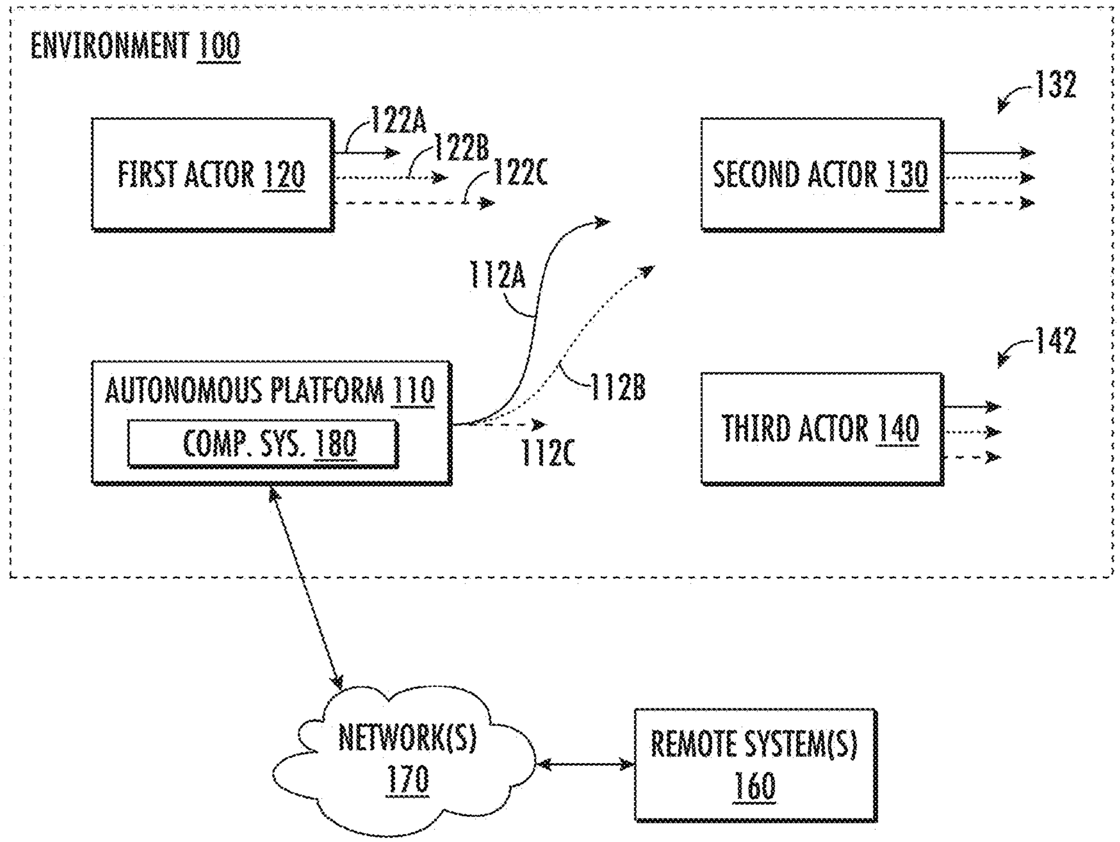
FIG. 1 is a block diagram of an example operational scenario, according to some implementations of the present disclosure.

With reference to FIGS. 1-17, example embodiments of the present disclosure are discussed in further detail. FIG. 1 is a block diagram of an example operational scenario according to example implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 can be or include an indoor environment (e.g., within one or more facilities, etc.) or an outdoor environment. An indoor environment, for example, can be an environment enclosed by a structure such as a building (e.g., a service depot, maintenance location, manufacturing facility, etc.). An outdoor environment, for example, can be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 can be any type of platform configured to operate within the environment 100. For example, the autonomous platform 110 can be a vehicle configured to autonomously perceive and operate within the environment 100. The vehicles can be a ground-based autonomous vehicle such as, for example, an autonomous car, truck, van, etc. The autonomous platform 110 can be an autonomous vehicle that can control, be connected to, or be otherwise associated with implements, attachments, or accessories for transporting people or cargo. This can include, for example, an autonomous tractor optionally coupled to a cargo trailer. Additionally or alternatively, the autonomous platform 110 can be any other type of vehicle such as one or more aerial vehicles, water-based vehicles, space-based vehicles, other ground-based vehicles, etc.

The autonomous platform 110 can be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) can be objects not in motion or not predicted to move ("static objects") or object(s) in motion or predicted to be in motion ("dynamic objects," "movers," or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s). In particular, according to example aspects of the present disclosure, the autonomous platform 110 can localize itself with respect to the environment 100 or with respect to the object(s) in the environment 100.

Figure 2:
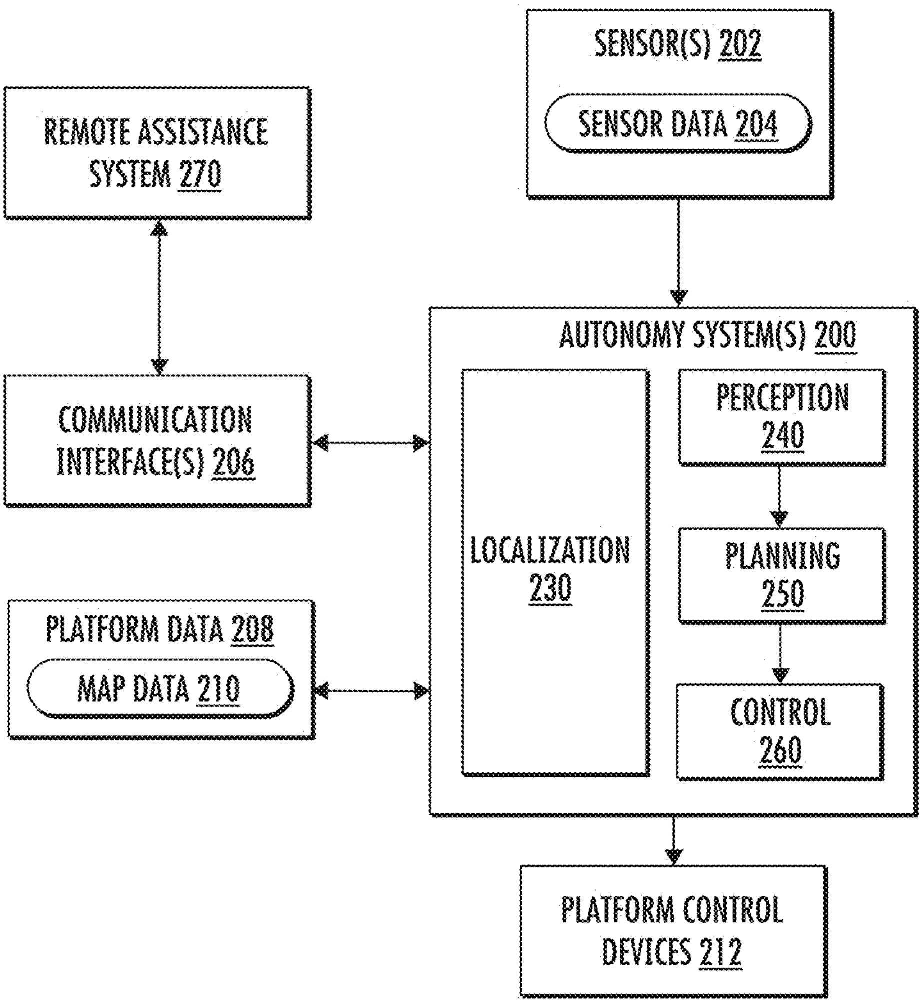
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 can include different subsystems for performing various autonomy operations. The subsystems can include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment can be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors 202, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform.

The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally or alternatively, the map data 210 can include sparse map data (e.g., lane graphs, etc.). In some implementations, the sensor data 204 can be fused with or used to update the map data 210 in real-time.

The autonomy system 200 can include the localization system 230 (e.g., a pose estimation system), which can provide an autonomous platform with an understanding of its location and orientation in an environment (its "pose"). In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.), also referred to as "global pose," or relative position (e.g., respecting an initial position of the autonomous vehicle, etc.), also referred to as "local pose." For instance, the local pose can be defined relative to a coordinate frame or frame of reference established with respect to the initial position of the vehicle and updated as the vehicle moves relative to its initial position. The local pose can be consistent over short timeframes, such as timeframes on the order of several seconds. The local pose may be periodically refreshed. For instance, periodically refreshing the local pose may contribute to mitigating the effects of pose drift over time. The global pose may instead be defined relative to a global coordinate system, such as a tiled map grid.

The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system (e.g., a global navigation satellite system (GNSS) such as GPS, BeiDou, GLONASS, Galileo, etc.), radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy can be a set of discrete decisions (e.g., yield to actor, reverse yield to actor, merge, lane change) that the autonomous platform makes. The strategy can be selected from a plurality of potential strategies. The selected strategy can be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger can be an alert, an error signal, a map feature, a request, a location, a traffic condition, a road condition, etc.

After initiating the session, the autonomy system 200 can provide context data to the remote assistance system 270. The context data can include sensor data 204 and state data of the autonomous platform. For example, the context data can include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning subsystem 250. Additionally or alternatively, assistive signal(s) can be considered by the autonomy system 200 as suggestive inputs for consideration in addition to other received data (e.g., sensor inputs, etc.).

The autonomy system 200 can be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
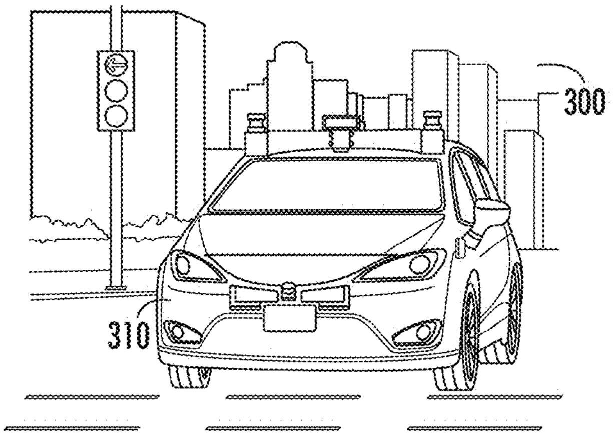
FIGS. 3A-3D are representations of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
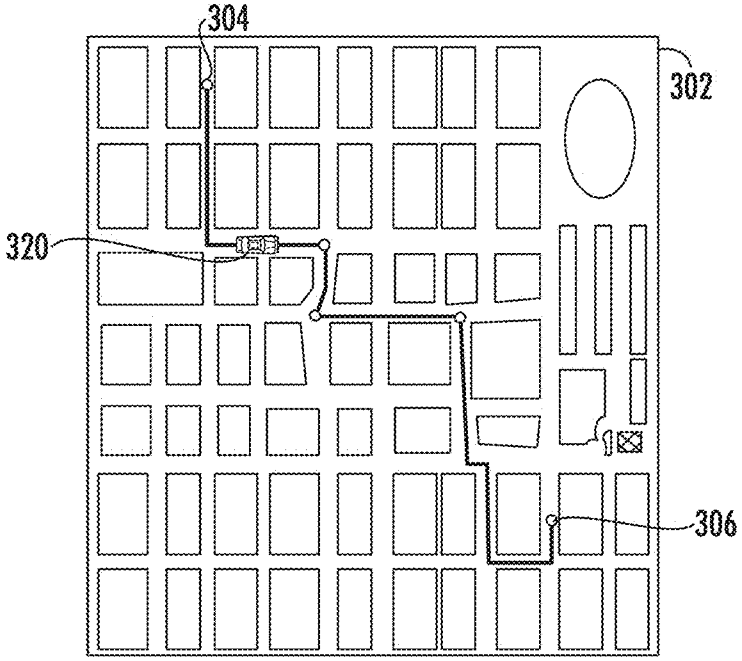

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
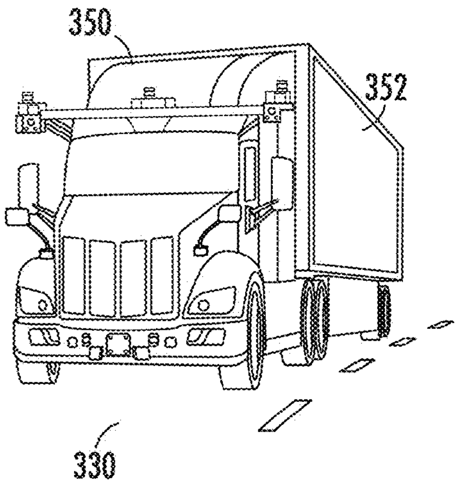

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
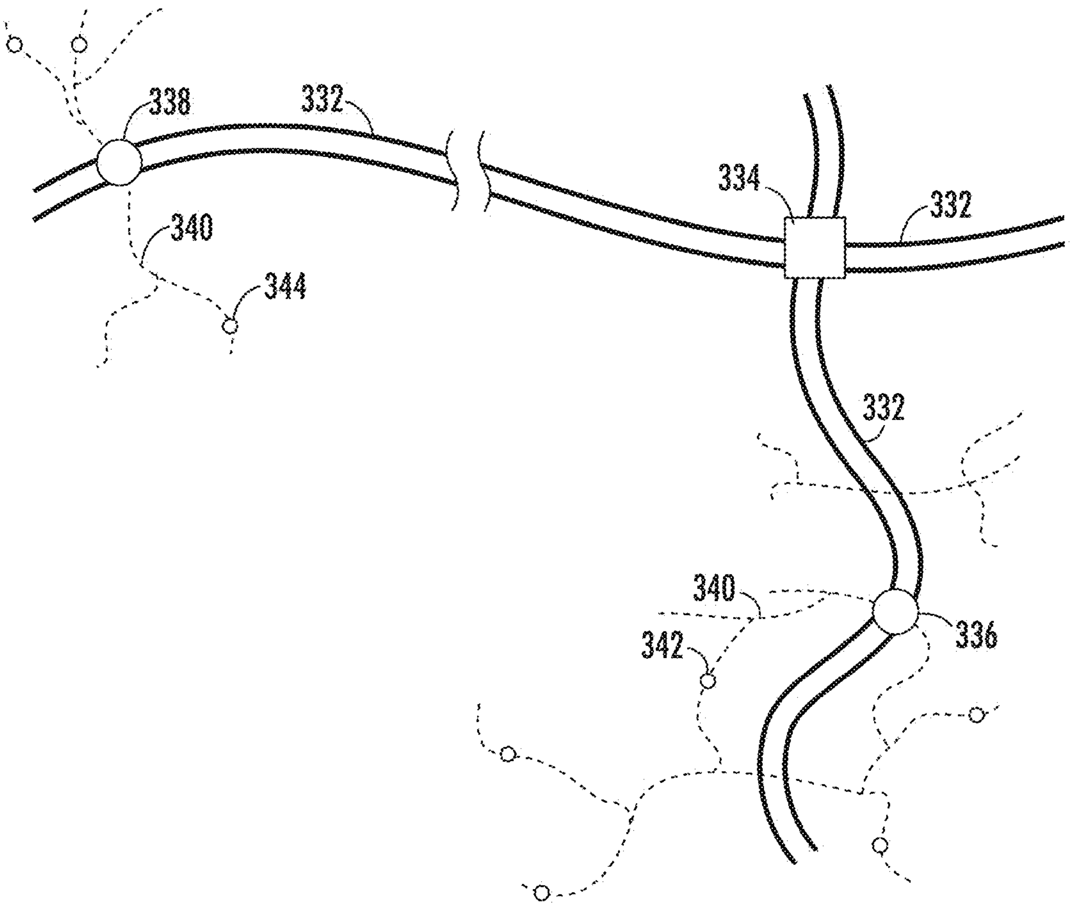

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the performance of an autonomous platform, such as an autonomous vehicle controlled at least in part using autonomy system(s) 200 (e.g., the autonomous vehicles 310 or 350), systems and methods according to example aspects of the present disclosure can provide for correction of longitudinal bias in LIDAR systems to improve the capability of the autonomous platform to navigate within its environment. In particular, the systems and methods disclosed herein can employ an iterative bias correcting process to identify and correct for the longitudinal bias, as described further herein.

Figure 4:
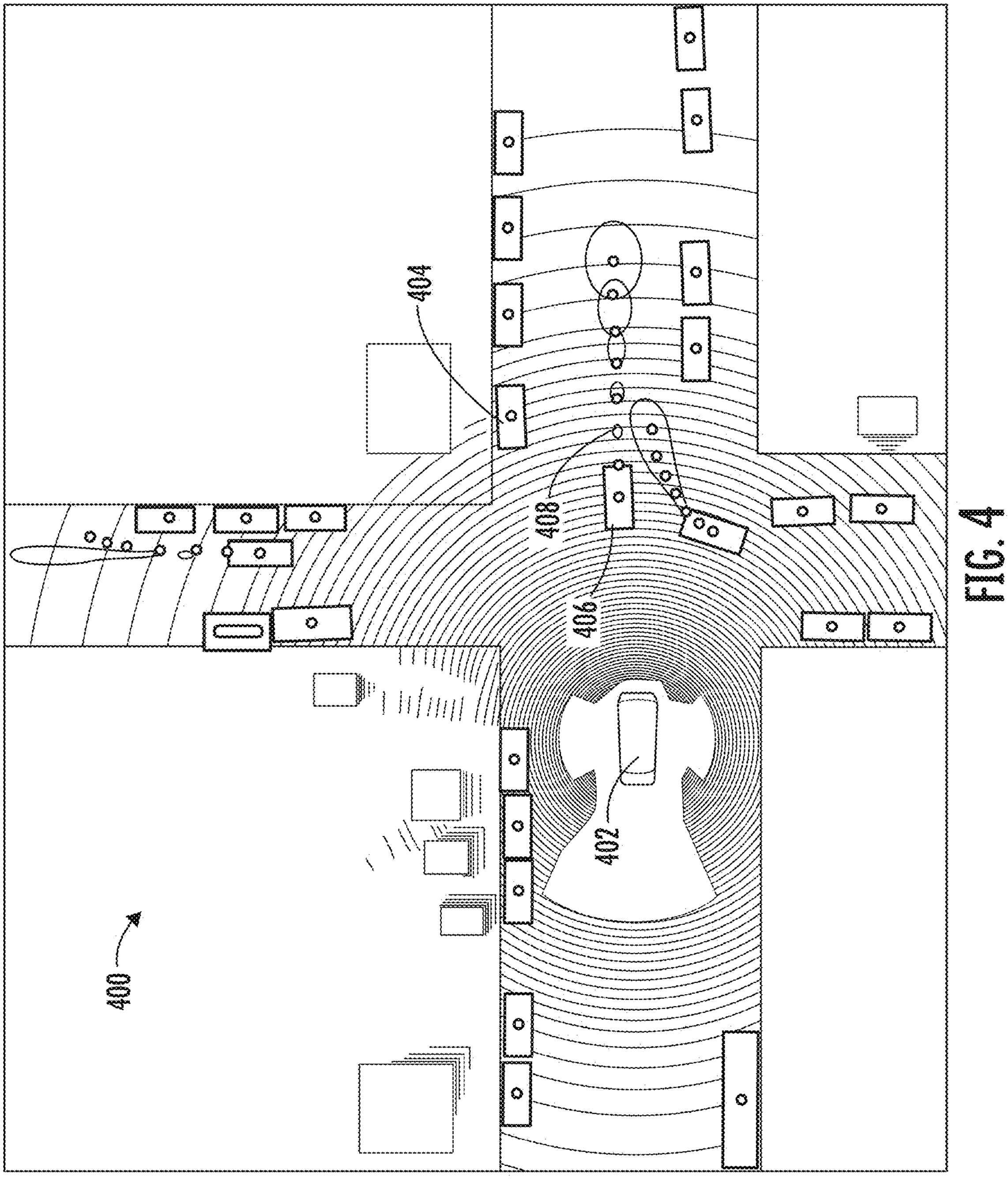
FIG. 4 is a diagram of an example LIDAR observation annotated with information about actors according to some implementations of the present disclosure.

FIG. 4 is a diagram of an example LIDAR observation 400. The LIDAR observation 400 is annotated with information about actors. The LIDAR observation 400 can be obtained from one or more LIDAR sensors. The LIDAR observation 400 can be or can include a LIDAR point cloud. The LIDAR point cloud can include one or more LIDAR points. The LIDAR points in the LIDAR point cloud can encode extensive data about an environment, such as intensity, classification of features, timestamps, and so on relative to a given coordinate frame associated with the LIDAR observation. The coordinate frame may be, for example, an X, Y, Z coordinate frame or other suitable coordinate frame. The LIDAR observation 400 can be oriented relative to a vehicle frame, where the vehicle frame is oriented with respect to a pose of a vehicle 402. The vehicle frame can be a coordinate frame related to the pose of the vehicle 402 at the time at which the LIDAR observation 400 is captured. For instance, the LIDAR data points may be arranged relative to an origin centered on the pose of the vehicle 402. Additionally or alternatively, the coordinate frame of the LIDAR observation 400 may be the vehicle frame itself. As one example, the LIDAR observation 400 may be captured relative to the pose of a vehicle 402 in a vehicle frame such that the LIDAR points are arranged based on a time of flight from the vehicle 402, as estimated by the vehicle's known pose. In some cases, the origin of the vehicle frame may not necessarily be the pose of the vehicle 402 itself. However, the pose of the vehicle 402 can be known in the vehicle frame.

The LIDAR observation 400 can be annotated with bounding boxes 404 describing the location of objects or actors within the environment of the vehicle 402. For instance, the bounding boxes 404 may describe locations of vehicles, pedestrians, or other objects of interest within the environment. The bounding boxes 404 may be produced by a perception system that receives as input the LIDAR observation. In addition, actors 406 may be annotated with a trajectory 408 describing forecasted motion of the actors 406 over time. For instance, a perception system may predict that actor 406 will move according to the trajectory 408.

Figure 5:
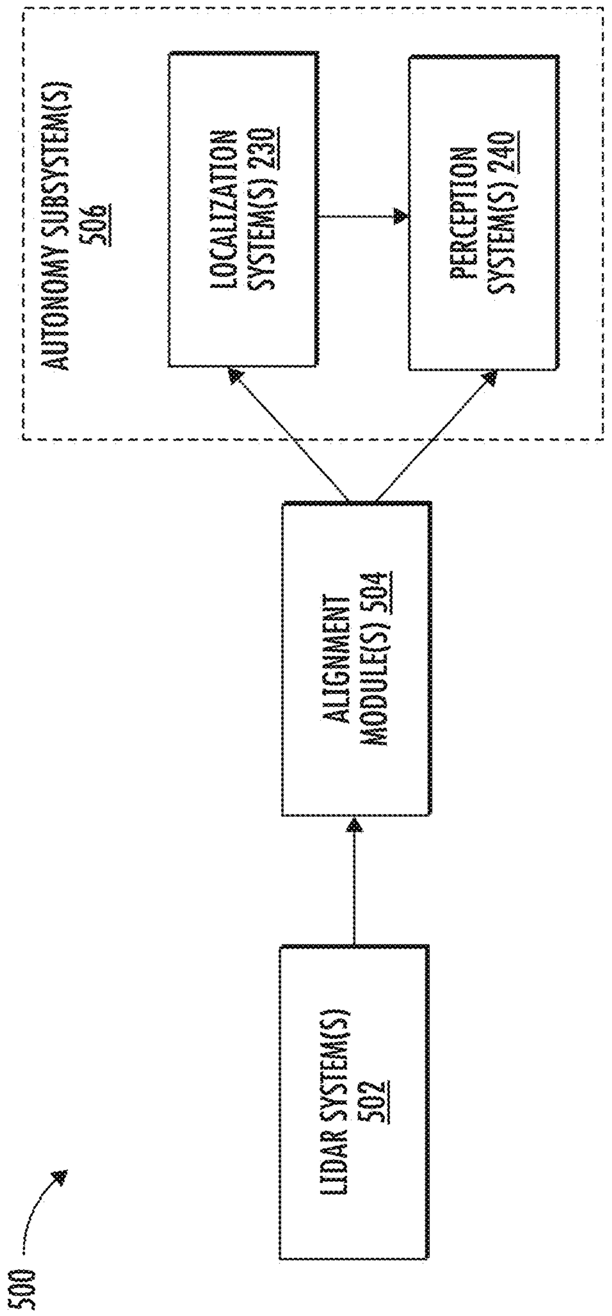
FIG. 5 is a block diagram of an example portion of a vehicle control system, according to some implementations of the present disclosure.

FIG. 5 is a block diagram of a portion of a vehicle control system 500, according to some implementations of the present disclosure. The vehicle control system 500 can be located onboard a vehicle. For example, the vehicle control system 500 can be an autonomous vehicle control system located onboard an autonomous vehicle.

The vehicle control system 500 can include one or more LIDAR system(s) 502. The LIDAR system(s) can provide LIDAR scans or LIDAR observations. For instance, the LIDAR scans can be obtained from one or more LIDAR sensors. The LIDAR scans can include one or more LIDAR points. The LIDAR point(s) in the LIDAR point cloud can encode extensive data about an environment, such as intensity, classification of features, timestamps, and so on relative to a given coordinate frame associated with the LIDAR scan. For example, the LIDAR scans provided by the LIDAR system(s) 502 can be or include the LIDAR observation 400 of FIG. 4.

The vehicle control system 500 can additionally include one or more alignment modules 504. The alignment module(s) 504 can align the LIDAR scans from the LIDAR system(s) 502 to a surfel map including a plurality of surfels. The resulting alignment can be used to determine the pose of the autonomous vehicle (e.g., in localization system 230, described below). A surfel, or "surface element," is a geometric structure used to approximate or represent a surface in the environment of the vehicle. In one implementation, a surfel can be or can include a disc defined by a position vector, a normal vector, and a radius. The position vector can describe the location of the centroid of the disc (relative to a given coordinate frame, such as the keyframe). The normal vector can describe the orientation of the surfel in three-dimensional space. As another example, the normal vector can define the approximate surface normal at the centroid. The radius can define the distance from the centroid of the surfel to the edge of the surfel. Generally, the use of a surfels as a simplified geometric representation of environment geometry can provide for improved aggregation of data across multiple LIDAR observations and provide for reduced computational requirements for reasoning about the environment of the vehicle.

In some implementations, the surfel map can be a regularly, progressively-updated map of the environment of the vehicle that is generated from data captured on-board the vehicle. For instance, in some implementations, the surfel map is generated using, at least in part, data from one or more prior LIDAR scans. For instance, the surfel map may be generated (e.g., in real-time) from LIDAR scans aggregated over a current operational instance of a vehicle. An operational instance can include, for example, a driving session including one or more trips, each trip involving ferrying one or more of passengers or freight over a distance. Additionally or alternatively, an operational instance can include a duration defined by an initialization of the vehicle and/or terminated by a deactivation of the vehicle. The surfel map may be routinely updated based on one or more LIDAR scans captured during the current operational instance. As an example, new LIDAR observations may be fitted to the existing surfel map based on LIDAR data (e.g., LIDAR points) that are representative of data already included in the local environment map. Additionally or alternatively, in some implementations, the surfel map may be stored remotely from the vehicle (e.g. at a remote map server) and downloaded as map data to the vehicle. The surfel map may aggregate data from a plurality of vehicles.

In some implementations, the resolution of the surfel map may decrease at farther distances from the position of the vehicle. For instance, in some implementations, the size of surfels in the surfel map may be smaller at positions close to the vehicle such that the immediate environment of the vehicle is represented with a high resolution. This can provide improved reasoning capabilities about the immediate environment of the vehicle. Additionally or alternatively, surfels farther from the vehicle may be larger and sparser such that comparatively less processing power is spent reasoning about surfels that do not represent portions of the environment near the vehicle.

The vehicle control system 500 can further include one or more autonomy systems, such as the localization system(s) 230 and perception system(s) 240 of FIG. 2. The autonomy system(s) 506 can be configured to perform operations for autonomously controlling the vehicle. The operations can include, for example, (i) determining a pose of the autonomous vehicle in the environment; (ii) determining a motion trajectory for the autonomous vehicle to navigate the environment; (iii) controlling a motion of the autonomous vehicle; or (iv) performing one or more autonomy operations for the autonomous vehicle.

Figure 6:
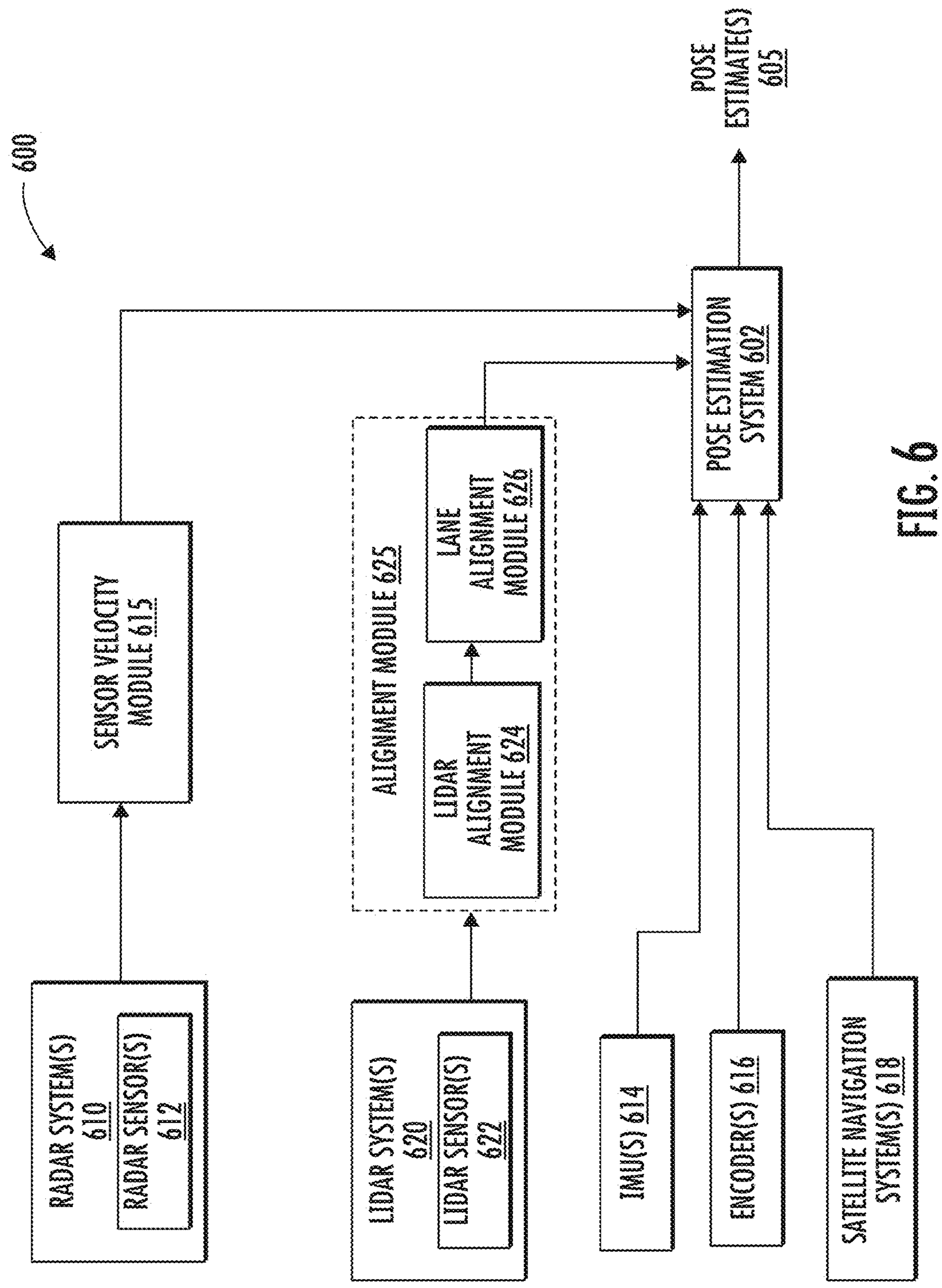
FIG. 6 is a block diagram of an example portion of an autonomous vehicle control system, according to some implementations of the present disclosure.

FIG. 6 is a block diagram of a portion of a vehicle control system 600, according to some implementations of the present disclosure. The vehicle control system 600 can be located onboard a vehicle (e.g., corresponding to the vehicle control systems depicted in other figures). For example, the vehicle control system 600 can be a vehicle control system located onboard an autonomous vehicle. In particular, FIG. 6 depicts one example of a localization system that may consume the LIDAR scan from LIDAR sensors, which may be corrected for longitudinal bias as described herein. It should be understood that other operations for controlling an autonomous vehicle may be determined based on the longitudinal bias.

FIG. 6 depicts inputs and outputs of a pose estimation system 602 according to example aspects of the present disclosure. The pose estimation system 602 can employ a localization filter to produce pose estimate(s) 605, such as a local pose estimate and a global pose estimate. In addition to the localization filter, the pose estimation system 602 can include one or more measurement buffers, state machines, and/or other systems for fusing measurements from distinct input sources. One example of a localization filter is a Kalman filter. A Kalman filter, or linear quadratic estimation filter, is an algorithm utilizing a series of measurements over time (which can include noise, biases, or other inaccuracies) to produce estimates of other, unknown variables. The Kalman filter can estimate a joint probability distribution over the variables at each time frame. The Kalman filter can employ a two-phase prediction process, in which the filter produces initial estimates of current state variables and uncertainties, then updates these estimates with a weighted average after the next measurement is observed. The use of a Kalman filter can provide for processing several measurements in real time, which is beneficial for autonomous platform navigation tasks.

The localization filter can consume inputs from a plurality of sensor systems or other onboard systems on a vehicle (e.g., autonomous vehicle 310) to produce the pose estimates 605. The inputs can include any suitable inputs from any suitable systems onboard or in communication with an autonomy system (e.g., autonomy system 200) such as, for example, range data (e.g., from a LIDAR system or RADAR system), doppler data encoding velocities associated with the range data (e.g., doppler RADAR data and/or doppler LIDAR data), encoder inputs (e.g., from wheel encoders), an IMU accumulator input (e.g., from an IMU accumulator system), sensor alignment data, LIDAR alignment data (e.g., from a LIDAR alignment tracking module), lane alignment data (e.g., from a lane alignment tracking module), map data, such as one or more map tiles (e.g., from a map data server, a global navigation satellite system (GNSS), etc.), and/or doppler data associated with the map data (e.g., doppler data from a satellite system), and pose estimates from a LIDAR odometry module, as described herein.

The system 600 can include one or more RADAR systems 610. Each RADAR system 610 can include one or more RADAR sensors 612. The RADAR systems 610 or RADAR sensors 612 can be positioned onboard an autonomous platform, such as an autonomous vehicle. For instance, each RADAR system 610 can have a field of view that covers a portion of an autonomous vehicle's environment. In some implementations, the RADAR system 610 can be or include Doppler RADARs.

The RADAR system(s) 610 or RADAR sensor(s) 612 can be associated with a sensor velocity module 615. The sensor velocity module 615 can be configured to estimate the velocity of the RADAR system 610 based on RADAR data from the RADAR sensors 612. For instance, the sensor velocity measurements can be the three-dimensional velocity of a given sensor with respect to the local frame or expressed in the sensor frame. These sensor velocity measurements can be computed from doppler readings of sensor returns (such as doppler RADAR or doppler LIDAR). In some implementations, a multiplicative bias may be applied to the sensor velocity measurements to compensate for any miscalibration of the RADAR system 610 (e.g., a RADAR array).

Additionally or alternatively, the system 600 can include one or more LIDAR systems 620. Each LIDAR system 620 can include one or more LIDAR sensors 622. The LIDAR systems 620 or LIDAR sensors 622 can be positioned onboard a vehicle, such as an autonomous vehicle or autonomous platform. For instance, each LIDAR system 620 can have a field of view that covers a portion of a vehicle's environment. In some implementations, sensor velocity measurements may be associated with the LIDAR sensors 622.

The system 600 can also include one or more modules to extract geographic or other identifiers from the LIDAR data produced by the LIDAR system(s) 620. As one example, the system 600 can include an alignment module 625. In some implementations, the alignment module 625 can include as separate LIDAR alignment module 624 and/or a lane alignment module 626. Alternatively, in some implementations, the alignment module 625 may be a single module.

The LIDAR alignment module 624 can match LIDAR data from the LIDAR system(s) 620 to known surfels on a larger surfel map. For instance, the LIDAR alignment module 624 can reconcile multiple views of LIDAR data in a consistent frame of reference based on the pose estimates of the vehicle and the distance between the vehicle and consistent features in the multiple views of LIDAR data. LIDAR alignment data can provide a three-dimensional geometric registration of LIDAR returns with respect to registered surface elements (surfels) in a given map tile. For instance, a LIDAR alignment module 624 can receive a measurement of global pose from a three-dimensional transformation of a tile from sensor state. The transformation can be a homogenous transformation of the pose of a given tile frame from an estimated LIDAR frame. A LIDAR alignment module can determine the location of LIDAR points with respect to the transformed global pose.

The lane alignment module 626 can analyze the LIDAR data to detect and orient lane boundaries in the environment of the autonomous platform that are visible in the LIDAR data. Lane alignment data can be a three-dimensional geometric registration of detected lane line points (e.g., lane boundaries) with respect to annotations in a map tile. For instance, a lane alignment module 626 can receive a measurement of global pose from a three-dimensional transformation between a first reference frame that is relative to a tiled global map and a second reference frame that is relative to a vehicle, a sensor, or other local frame. The transformation can be a homogenous transformation of the pose of a given tile frame from an estimated LIDAR frame. The lane alignment module 626 can determine the location of lane line points with respect to the transformed global pose.

Additionally or alternatively, the system 600 can include one or more inertial measurement units (IMUs) 614. The IMUs 614 can include accelerometers, gyroscopes, magnetometers, compasses, etc. to measure orientation, specific force, angular rate, or other motion characteristics of the autonomous platform. One example IMU includes a three-axis accelerometer and a three-axis rate gyroscope. The IMU can be connected over a vehicle bus (e.g., the vehicle's CAN bus). The axes can be sampled independently or together and provided as messages over the bus. For instance, the IMUs 614 can output IMU data. In some implementations, an IMU accumulator can be included to accumulate data from the IMUs 614 over time and generate a persistent orientation measurement based on transient signals from the IMUs 614.

Additionally or alternatively, the system 600 can include one or more wheel encoders 616. The wheel encoders 616 can generate encoder data descriptive of revolutions of wheels on the autonomous platform. For instance, the wheel encoders 616 can convey a number of revolutions (or partial revolutions) of wheels on the vehicle.

The system 600 can also communicate with one or more satellite navigation systems 618. The satellite navigation system(s) 618 can utilize one or more orbital satellites to provide geospatial positioning. Example satellite navigation systems 618 include global navigation satellite systems (GNSS) such as the Global Positioning System (GPS), GLONASS, Galileo, BeiDou, etc. Any suitable satellite navigation system can be employed in accordance with the present disclosure.

In some implementations, the satellite navigation system(s) 618 can provide a satellite doppler measurement for the pose estimation system 602. The satellite doppler measurement can be a measure of the doppler characteristics of the carrier phase signal received from a respective transmitting satellite. This doppler measurement can be directly proportional to the relative velocity between the transmitting satellite and a receiver (e.g., a GNSS receiver) onboard the vehicle. In some cases, the doppler measurement may be biased by a stochastically-wandering clock-rate error in the receiver. A receiver may have a respective bias that is applied to all measurements from that receiver. The bias may be relatively small (e.g., nanosecond-scale). This bias may be parametrized in the localization filter. For instance, the bias may be parameterized in units of meters-per-second by multiplying the receiver bias with the speed of light. Furthermore, this can counter round-off errors associated with comparing smaller (e.g., nanosecond-scale) values with other values in the localization filter having larger scales. The satellite navigation system(s) 618 can additionally provide an ephemeris from a respective satellite that can be used to determine the position and velocity of the respective satellite in an earth-centered, earth-fixed (ECEF) coordinate frame.

Figure 7:
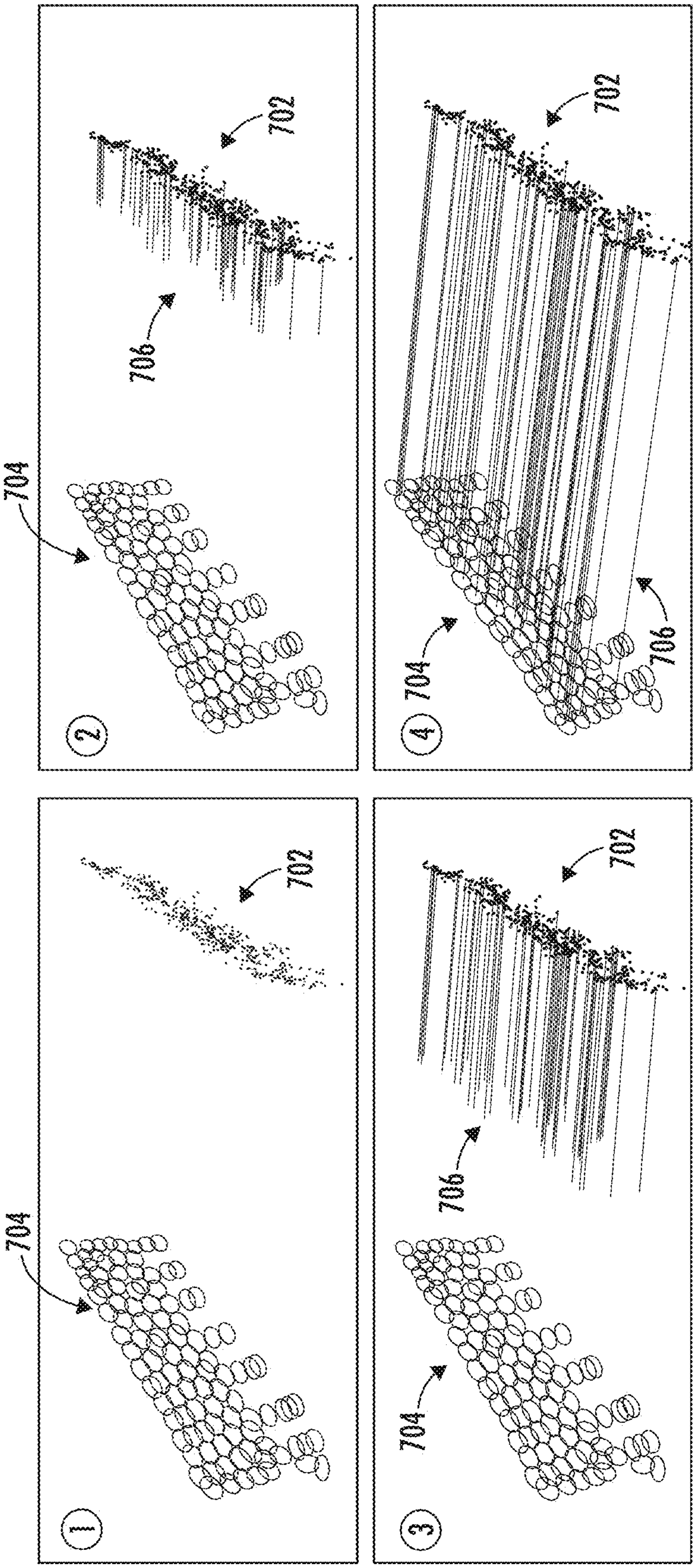
FIG. 7 is a graphical depiction of example scenarios according to some implementations of the present disclosure.

FIG. 7 is a graphical depiction of systems and methods described herein. Step (1) illustrates longitudinally-biased LIDAR points 702 relative to a surfel structure 704. The surfel structure 704 includes a plurality of surfels from a surfel map, representing an object in the environment of an autonomous vehicle, such as a sign or billboard. As illustrated, the LIDAR points 702 generally resemble the correct shape of the surfel structure 704, but are offset from the surfel structure 704. If not longitudinally biased, the LIDAR points 702 would lie substantially on the surfel structure 704.

Steps (2) through (4) depict varying lengths of shift vectors 706 at different iterations. For instance, in the first iteration depicted in step (2), the LIDAR points 702 are shifted slightly closer to the surfel structure 704. At the second iteration depicted in step (3), the LIDAR points 702 are shifted still closer, and at step (4) the LIDAR points 702 are shifted to be nearly coincident with the surfel structure 704. As illustrated, the shift vectors 706 depict a consistent offset for each step. At step (4), the length of the shift vectors 706, and the offset in the shifted representation, correspond to the longitudinal bias.

Figure 8:
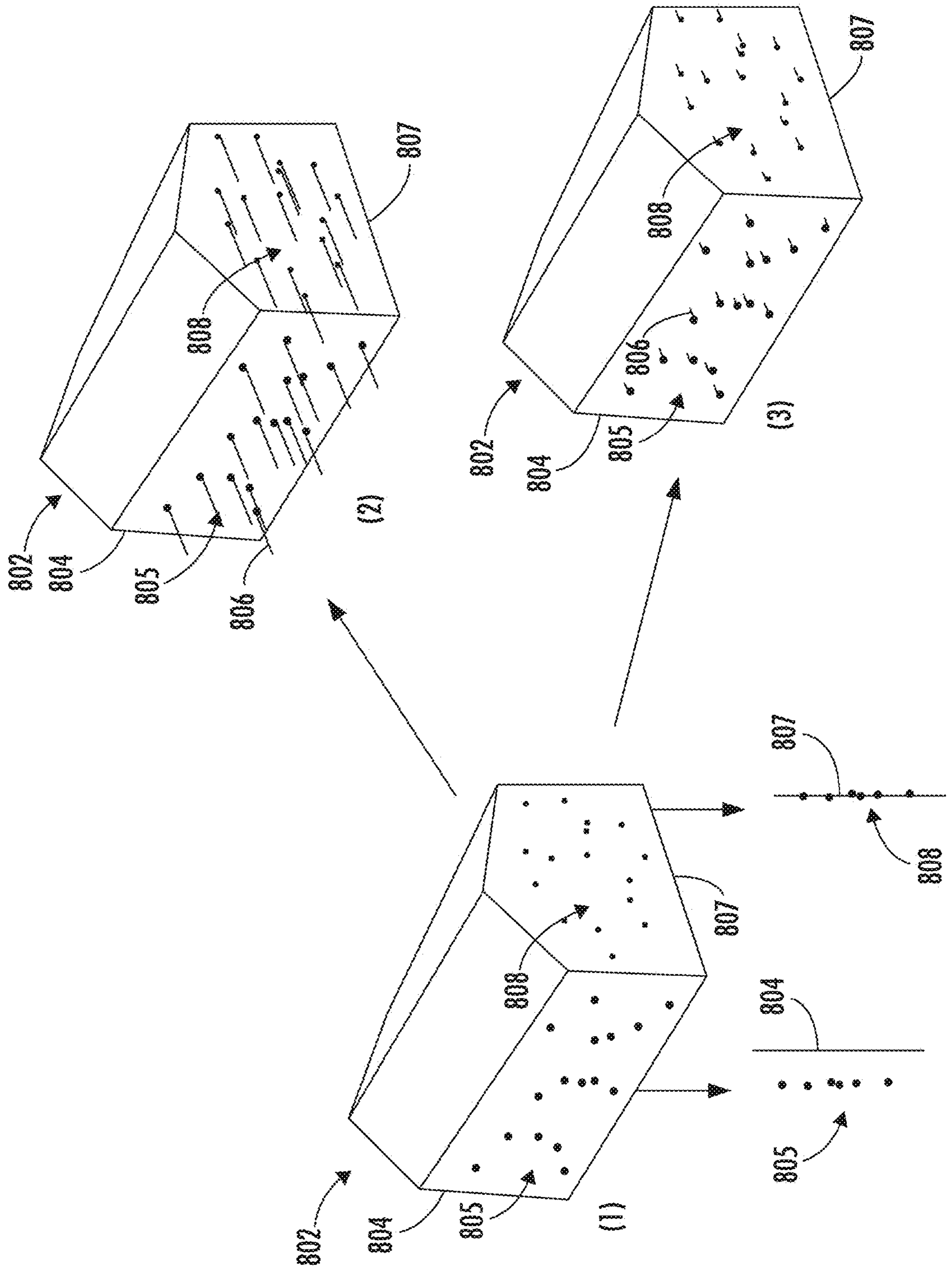
FIG. 8 is a graphical depiction of example scenarios according to some implementations of the present disclosure.

FIG. 8 is a graphical depiction of explained and unexplained points, as described herein. This process may allow the discovery "well explained" points that would be weighted against unexplained points to determine whether a true longitudinal bias exists.

FIG. 8 depicts a structure 802 including a first surface 804 and a second surface 807. The structure 802 may be represented by surfels (not illustrated) in a surfel map that are generally descriptive of the geometry of the structure 802. One or more LIDAR points 805 are generally coincident with the first surface 804, and one or more LIDAR points 808 are generally coincident with the second surface 807. For the purposes of illustration, only a few LIDAR points 805 and 808 are illustrated. However, it should be understood that a LIDAR system may output hundreds if not thousands of LIDAR points for a given surface.

Diagram (1) illustrates the alignment between a LIDAR scan and structure 802 without accounting for longitudinal bias. Generally, the matching algorithm (e.g., part of a longitudinal bias check, meant to prevent false positives) will match the points 808 to the surfels of the second surface 807, so they will become explained points. The points 805, however, will be too far from the first surface 804, so they will become unexplained points. The points may be slightly perturbed forward and backward in a much smaller scale compared to that of FIG. 7, so as to save computation time.

Diagram (2) illustrates the LIDAR points 805 and 808 shifted in a first direction (e.g., along the longitudinal direction). Residuals 806 are illustrated to depict the difference between the original position and the shifted position. As illustrated, the points 805, 808 are shifted in the wrong direction. None of the unexplained points 805 have become explained, and some of the previously-explained points 808 have become shift-unexplained points. Shift-unexplained points can include points that are no longer explained when shifted. Such points, for example, may have fallen outside of the second surface 807.

Diagram (3) illustrates the LIDAR points 805 and 808 shifted in a second direction (e.g., along the longitudinal direction and opposite the first direction). As illustrated, the unexplained points 805 have become shift-explained points. Shift-explained points can include points that were formerly-unexplained points that become explained when shifted. Such points, for example, may have come within range of matching to the first surface 804. The explained points 808 have not left the second surface 807, so they remain explained. This iteration represents a corrected longitudinal bias.

Figure 9:
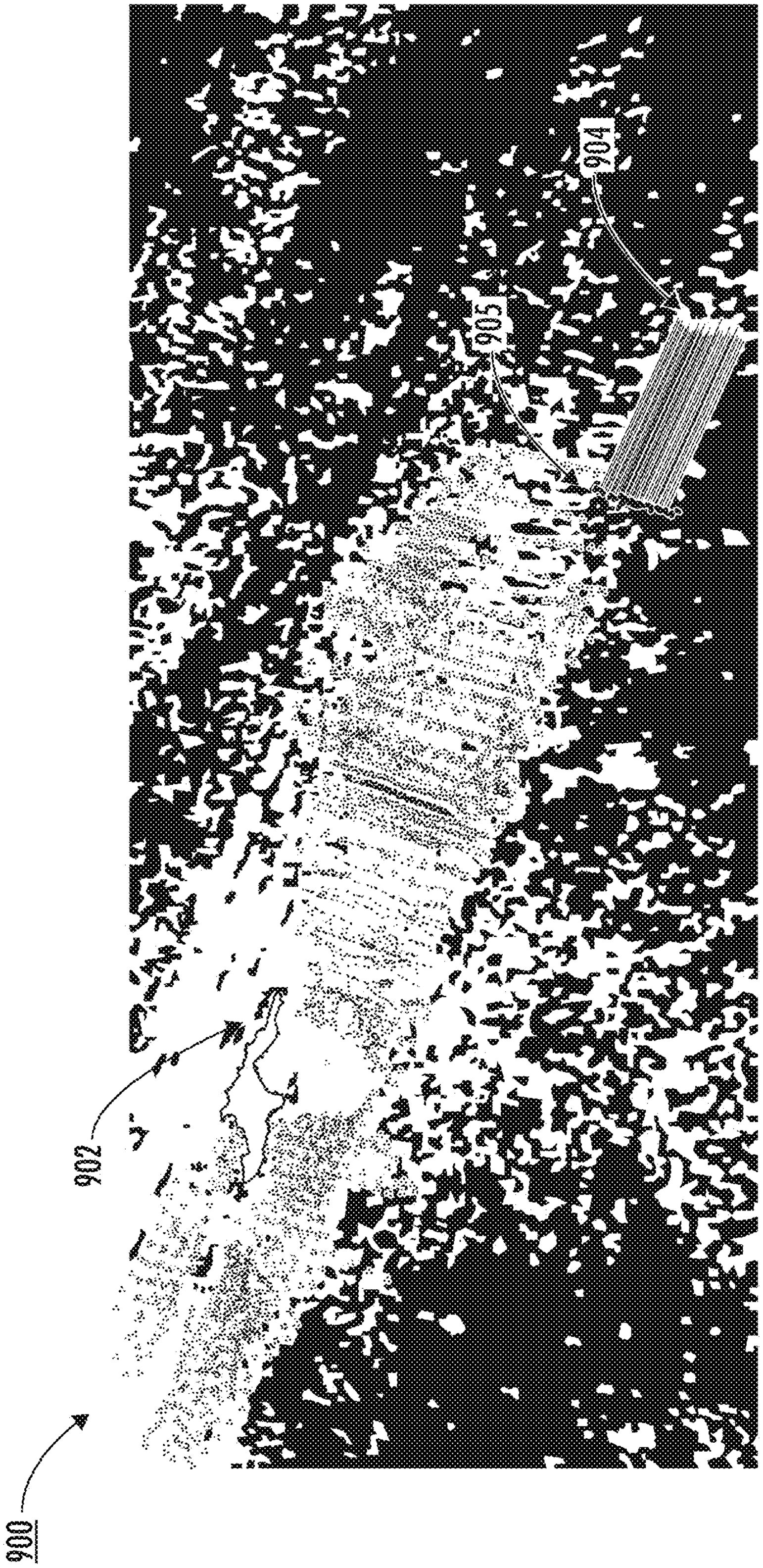
FIG. 9 is a graphical depiction of example scenarios according to some implementations of the present disclosure.

In one implementation, only points that become shift-unexplained in both directions may be used as counter-evidence FIG. 9 depicts a graphical representation 900 of a LIDAR scan according to example aspects of the present disclosure. The LIDAR scan is captured from the perspective of a vehicle 902. As illustrated in FIG. 9, a plurality of LIDAR points 905 are shifted to the position of an object 904, allegedly correcting for longitudinal bias. The allegedly-biased LIDAR points 905, however, are localized to only a relatively small region that is explainable by simple geometry. It is more likely that this scenario corresponds to a case where the object 904 is shifted relative to its recorded position in the surfel map, which would likely be somewhere close to the LIDAR points 905. This example represents a false positive condition where a high number of unexplained points are created by symptoms other than longitudinal bias. An example of correcting this condition is described in greater detail with respect to FIG. 14 below.

Figure 10A:
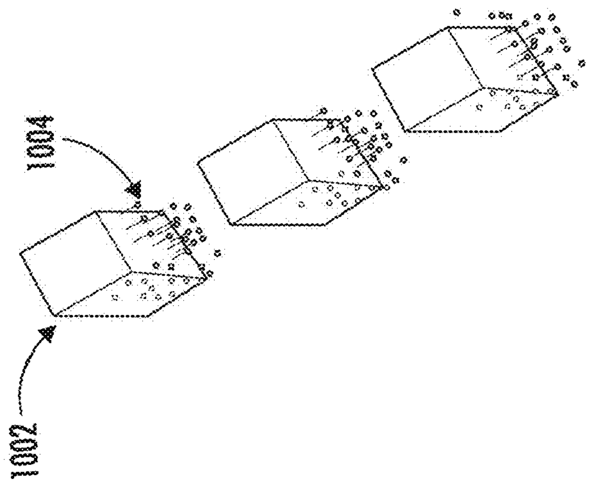
FIGS. 10A-10C are graphical depictions of example scenarios according to some implementations of the present disclosure.
Figure 10B:
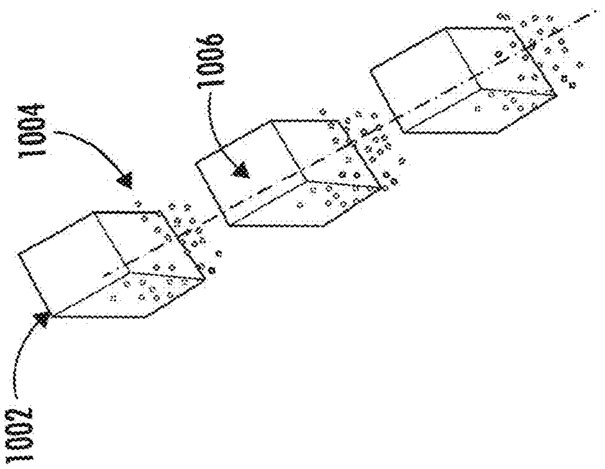

FIGS. 10A-10B depict a simplified graphical representation of systems and method described herein. In particular, FIG. 10A depicts an example where unexplained points 1004 are offset from a surfel structure 1002. An object may produce the points 1004. For example, a train car that travels generally along the longitudinal direction, and is in a different position now from when it was included in the surfel map. As illustrated, the unexplained points 1004 are shifted to the surfel structure 1002, indicating that there is a longitudinal bias. This represents another false positive condition where a high number of unexplained points are created by symptoms other than longitudinal bias. An example of correcting this condition is described in greater detail with respect to FIG. 15 below.

Figure 10C:
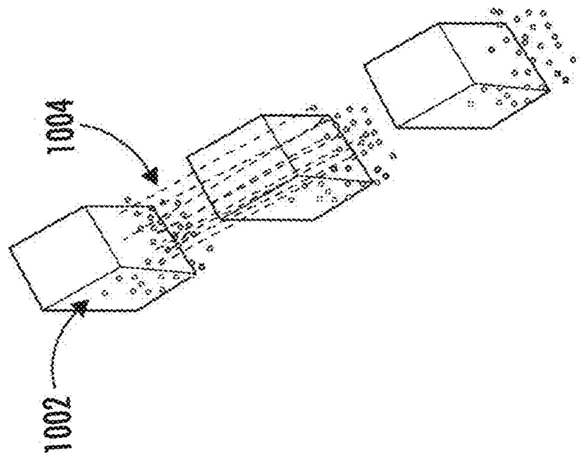

FIG. 10B illustrates a line 1006 fit through the unexplained points 1004. As illustrated, the line 1006 generally follows the direction the train cars travel. When these unexplained points 1004 are localized to a relatively small region in a larger LIDAR scan, they can be fit (e.g., by a RanSaC fitting) to a line having a substantially greater length than width or depth. This can be a line in a three-dimensional space or reference frame. Furthermore, FIG. 10C illustrates that the unexplained points 1004 can be shifted along the fitted line to encounter a second surface, corresponding to another end of the train car or the start of a new train car. When both of these conditions are true, the system can ignore the longitudinal bias, as explained in greater detail with respect to FIG. 15 below.

Figure 11:
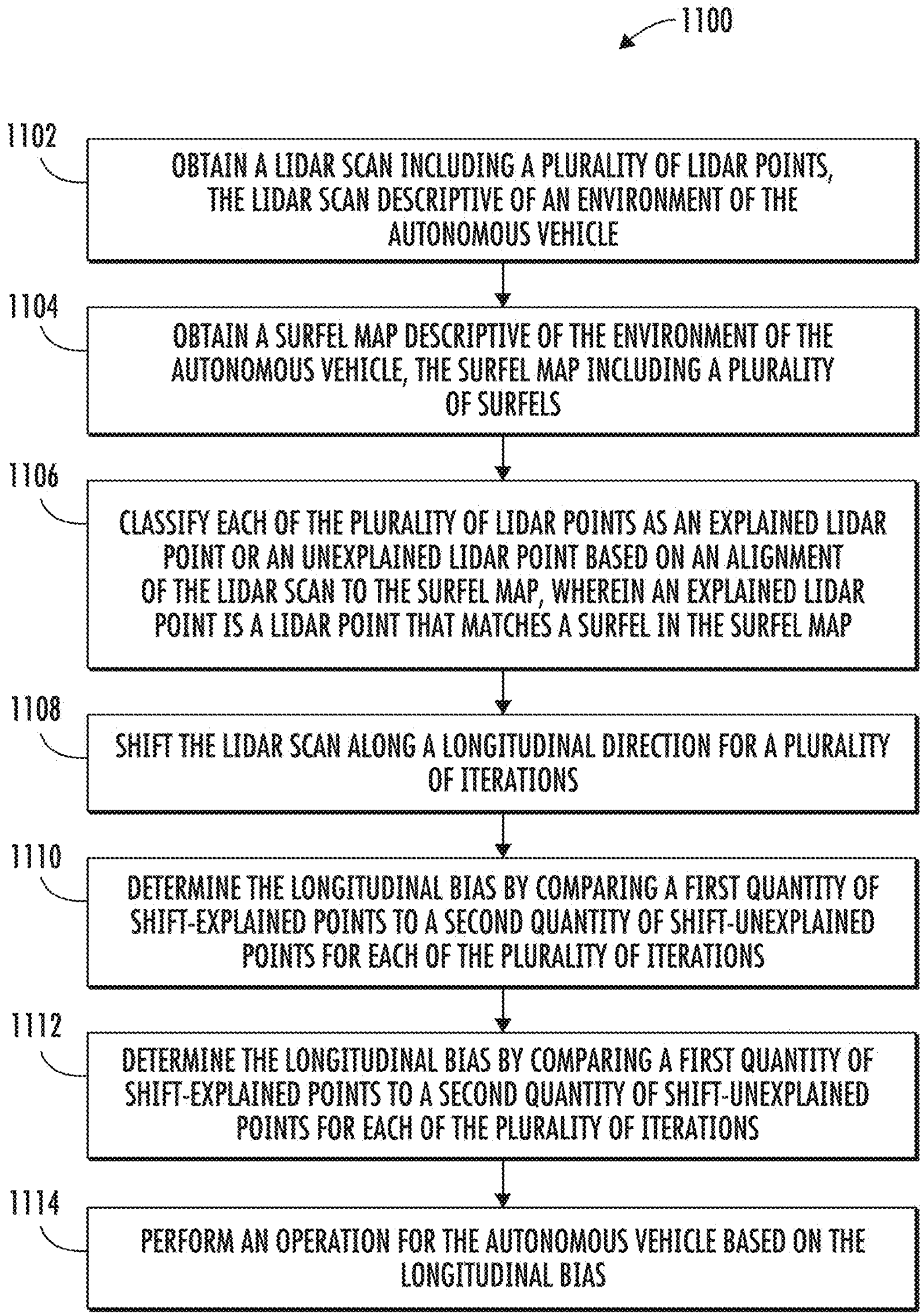
FIGS. 11-16 are flowcharts of example methods according to some implementations of the present disclosure.

FIG. 11 is a flowchart of a method 1100 for detecting longitudinal bias in an autonomy system of an autonomous vehicle, according to some implementations of the present disclosure. One or more portion(s) of the method 1100 can be implemented by one or more computing devices such as, for example, the computing systems described with reference to the other figures (e.g., autonomous platform 110, vehicle computing system 180, remote system(s) 160, a system of FIGS. 5, 6, 17, etc.). Each respective portion of the method 1100 can be performed by any (or any combination) of one or more computing devices. Moreover, one or more portion(s) of the method 1100 can be implemented on the hardware components of the device(s) described herein (e.g., as in FIGS. 1, 2, 5, 6, 17, etc.), for example.

FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of method 1100 can be performed additionally, or alternatively, by other systems.

At 1102, the method 1100 can include obtaining a LIDAR scan (or LIDAR observation). The LIDAR scan can be obtained from one or more LIDAR sensors. The LIDAR scan can include a plurality of LIDAR points. For instance, the LIDAR scan can be or can include a LIDAR point cloud containing the plurality of LIDAR points. The LIDAR scan can be descriptive of an environment of an autonomous vehicle. For instance, the LIDAR points can reflect the geometry of the environment surrounding the autonomous vehicle. As one example, the LIDAR points can be or can include coordinates relative to an origin or pose, representing distance and direction from the autonomous vehicle. As another example, the LIDAR points may be descriptive of time of flight in a direction from the vehicle.

In some implementations, the LIDAR scan can be associated with a current pose of the vehicle. For instance, in some implementations, the LIDAR observation can be oriented relative to a vehicle frame, where the vehicle frame is oriented with respect to the current pose of a vehicle. The vehicle frame can be a coordinate frame related to the pose of the vehicle at the current time at which the LIDAR observation is captured. For instance, the LIDAR data points may be arranged relative to an origin centered on the pose of the vehicle. Additionally or alternatively, the coordinate frame of the LIDAR observation may be the vehicle frame itself. As one example, the LIDAR scan may be captured relative to the pose of a vehicle in a vehicle frame such that the LIDAR points are arranged based on a time of flight from the vehicle, as estimated by the vehicle's known pose.

In some cases, the origin of the vehicle frame may not necessarily be the pose of the vehicle itself. However, the pose of the vehicle can be known in the vehicle frame.

At 1104, the method 1100 can include obtaining a surfel map descriptive of the environment of the autonomous vehicle. The surfel map can include a plurality of surfels. As described herein, in one implementation, a surfel can be or can include a disc defined by a position vector, a normal vector, and a radius. The surfel map may generally describe the environment of the autonomous vehicle as a collection of surfels that, when visualized, generally approximate the surfaces and structures present in the environment. For instance, the surfel map can approximate the three-dimensional geometry of the environment through its surfel representation.

In some implementations, the surfel map is populated based on one or more prior LIDAR scans captured by the autonomous vehicle. For instance, the surfel map may be progressively updated by accumulating LIDAR scans throughout operation of the autonomous vehicle, and creating surfels that explain the LIDAR points in the LIDAR scans. Additionally or alternatively, in some implementations, the surfel map may be generated and/or fixed prior to the autonomous vehicle's travel. For instance, in some implementations, the surfel map may be generated from one or more prior operations by autonomous vehicles (or other mapping vehicles) through the environment. The surfel map may be stored (e.g., remotely) and accessible by the vehicle.

At 1106, the method 1100 can include classifying each of the plurality of LIDAR points as an explained LIDAR point or an unexplained LIDAR point based on an alignment of the LIDAR scan to the surfel map. As used herein, an explained LIDAR point is a LIDAR point of the plurality of LIDAR points in the LIDAR scan that matches a surfel in the surfel map. Similarly, an unexplained LIDAR point is a LIDAR point in the plurality of LIDAR points of the LIDAR scan excluding the explained LIDAR points. For instance, an unexplained LIDAR point can be a LIDAR point in the plurality of LIDAR points of the LIDAR scan that does not match a surfel in the surfel map. In the case that the LIDAR is longitudinally biased, the unexplained LIDAR points may follow the shape of the existing geometry, but be offset forwards or backwards along the autonomous vehicle's direction of travel.

Figure 12:
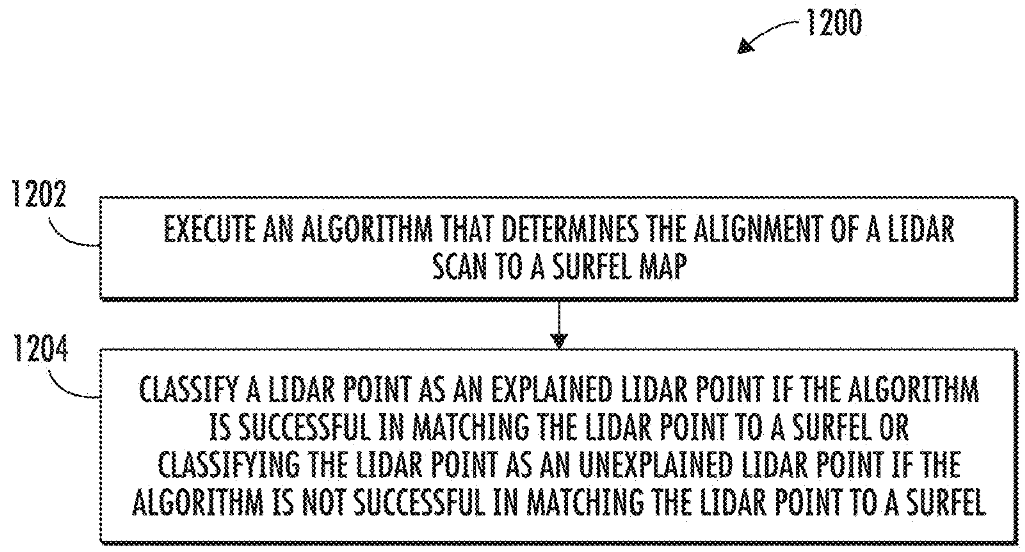

Generally, a LIDAR point may match a surfel if it is within a certain distance of the surfel, although the exact criteria for matching may be algorithm-specific. Various approaches may be employed to match LIDAR points to the surfel map in accordance with the present disclosure. One example approach for matching LIDAR points to the surfel map is described below with reference to FIG. 12. FIG. 12 depicts a method 1200 for classifying a plurality of LIDAR points as an explained LIDAR point or an unexplained LIDAR point according to the present disclosure. Those of ordinary skill in the art, using the disclosures provided herein, will understand that the elements of any of the methods discussed herein can be adapted, rearranged, expanded, omitted, combined, or modified in various ways without deviating from the scope of the present disclosure.

At 1202, the method 1200 can include executing an algorithm that determines the alignment of the LIDAR scan to the surfel map. For instance, the algorithm can build associations between LIDAR points of the LIDAR scans and surfels of the surfel map. The associations may not necessarily be an exact match, but may also be within some error margin between the two representations. As one example, the algorithm can be an iterative closest point (ICP) algorithm. ICP is an algorithm that produces a minimum cost alignment between two sets of spatial data, where cost is frequently represented by distance between two aligned datapoints.

At 1204, the method 1200 can include classifying a LIDAR point as an explained LIDAR point if the algorithm is successful in matching the LIDAR point to a surfel or classifying the LIDAR point as an unexplained LIDAR point if the algorithm is not successful in matching the LIDAR point to a surfel. For instance, if the algorithm is an ICP algorithm, points that are a significant distance from any surfel may be unsuccessful in matching to any surfel. A "residual vector" may be defined as the difference between a LIDAR point and its closest corresponding surfel.

Returning now to FIG. 11, at 1108, the method can include shifting the LIDAR scan along a longitudinal direction for a plurality of iterations. The LIDAR scan can be shifted in each direction (e.g., forwards and backwards) along the longitudinal direction. The longitudinal direction may be a direction by which the LIDAR system could be longitudinally biased. As one example, the longitudinal direction can be a direction of travel of the autonomous vehicle. The LIDAR scan may be shifted by a discrete (or variable) step size at each of the plurality of iterations. At each iteration, the number of formerly-unexplained points that become explained when shifted (e.g., shift-explained points) and the number of formerly-explained points that are no longer explained when shifted (e.g., shift-unexplained points) are determined. Generally, the greater the number of shift-explained points, the higher the likelihood that the shifted representation of the LIDAR scan at that iteration corrects for the longitudinal bias. The shift-unexplained points, however, act as "counter-evidence" that the shifted representation is inaccurate. Shifting the points along the longitudinal direction can provide improvements to computing-related technology by reducing the complexity of computations associated with transforming the LIDAR scan, as the shift can be accomplished by relatively simple coordinate arithmetic. This, in turn, can provide reduced computing resources and facilitate the use of this technology onboard autonomous vehicles, which often demand strict latency and resource requirements.

Figure 13:
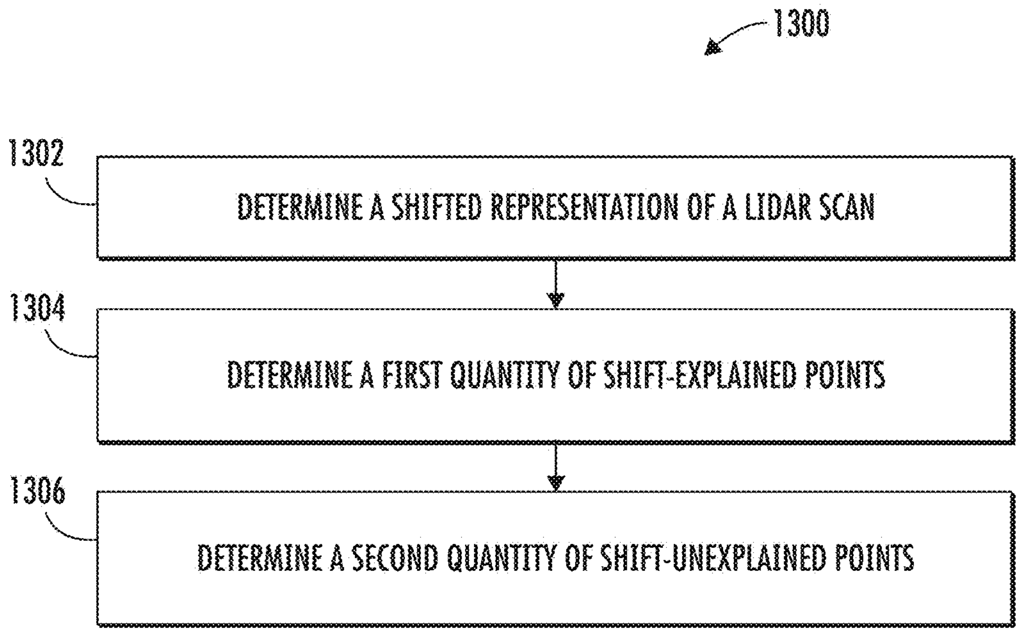

One example iteration is described with respect to method 1300 of FIG. 13. The steps of method 1300 may be repeated for some or all iterations of the plurality of iterations. Those of ordinary skill in the art, using the disclosures provided herein, will understand that the elements of any of the methods discussed herein can be adapted, rearranged, expanded, omitted, combined, or modified in various ways without deviating from the scope of the present disclosure.

At 1302, the method 1300 can include determining a shifted representation of the LIDAR scan. The shifted representation of the LIDAR scan can include a plurality of shifted LIDAR points. The shifted LIDAR points can be derived from the LIDAR points of the LIDAR scan by shifting the LIDAR points by an offset (e.g., a multiple of a step size). The offset can be along the longitudinal direction. For instance, in some implementations, the step size may be an integer or floating point representation of a real value, and the offset may be determined by projecting a multiple of the step size to the longitudinal direction. As another example, the offset may be a vector in the longitudinal direction with a length defined by the step size or a multiple thereof.

At 1304, the method 1300 can include determining a first quantity of shift-explained points. As used herein, a shift-explained point is an unexplained LIDAR point from the LIDAR scan (e.g., before shifting) that matches a surfel in the surfel map in the shifted representation in the particular iteration. Furthermore, at 1306, the method 1300 can include determining a second quantity of shift-unexplained points. As used herein, a shift-unexplained point is an explained LIDAR point from the LIDAR scan (e.g., before shifting) that does not match a surfel in the surfel map in the shifted representation in the particular iteration. In some implementations, the shift-explained points and the shift-unexplained points may be determined by performing a matching algorithm (e.g., the algorithm used to determine the alignment between the LIDAR scan and the surfel map). In some implementations, the matching may be performed by a distance comparison. For instance, a shift-explained point may be within a threshold distance of at least one surfel in the surfel map and/or a shift-unexplained point may not be within the threshold distance of any of the surfels in the surfel map.

In some implementations, the nature of shifting may be slightly different for determining the second quantity. For example, this may include a smaller second search range (e.g., ±1 meters) compared to the first search range (e.g., ±20 meters) for determining the first quantity.

Returning again to FIG. 11, at 1110, the method 1100 can include determining the longitudinal bias by comparing the first quantity to the second quantity for each of the plurality of iterations. For instance, the iteration that successfully corrects for the longitudinal bias can be an iteration having a high first quantity of shift explained points and a low second quantity of shift-unexplained points.

In some implementations, for instance, determining the longitudinal bias can include identifying a bias-correcting iteration of the plurality of iterations based on a weighing of shift-explained points against/to shift-unexplained points respective to each iteration of the plurality of iterations. Each iteration may weigh the first quantity of shift-explained points against the second quantity of shift-unexplained points. A higher weight may be that include greater amounts of shift-explained points relative to the amount of shift-unexplained points or as otherwise weighted herein.

In some implementations, identifying the bias-correcting iteration can include: (i) determining an iteration of the plurality of iterations having a highest weight of the plurality of weights; and (ii) identifying the iteration of the plurality of iterations having the highest weight of the plurality of respective weights as the bias-correcting iteration. The highest weight may be one that includes the greatest amount of shift-explained points relative to the amount of shift-unexplained points, or as otherwise weighted herein (as compared to other iterations). The shifted representation of the bias-correcting iteration (e.g., determined by weight) can reverse the longitudinal bias by its shift. The offset of the bias-correcting iteration is therefore at least a close approximation of the longitudinal bias (e.g., its opposite).

In some implementations, for instance, determining the longitudinal bias can include identifying a bias-correcting iteration of the plurality of iterations based on a plurality of respective ratios of the first quantity of shift-explained points to the second quantity of shift-unexplained points respective to each iteration of the plurality of iterations. Each iteration has a respective ratio of the first quantity to the second quantity. For instance, in some implementations, identifying the bias-correcting iteration can include: (i) determining an iteration of the plurality of iterations having a greatest ratio of the plurality of respective ratios; and (ii) identifying the iteration of the plurality of iterations having the greatest ratio of the plurality of respective ratios as the bias-correcting iteration. The shifted representation of the bias-correcting iteration (e.g., determined by ratio) can reverse the longitudinal bias by its shift. The offset of the bias-correcting iteration is therefore at least a close approximation of the longitudinal bias (e.g., its opposite).

In some implementations, the shift-explained points may be weighted in the respective ratio based on verticality of a closest corresponding surfel respective to the shift-explained points. The verticality of the closest corresponding surfel can be, for example, a similarity between the longitudinal direction and a normal of the closest corresponding surfel. The verticality of the surfel may correlate to how useful the surfel is in determining longitudinal bias. For instance, consider that a primarily horizontal surfel, such as the ground, will vary less over the longitudinal direction than a primarily vertical surfel, such as a wall or sign. By way of example, the algorithm may favor vertical surfels over horizontal surfels, because the former may tend to be artificial structures e.g. walls, poles, etc. that serve as reliable signals.

In some implementations, the bias-correcting iteration may only be identified if the bias correction is significant, such as if the weight is above a threshold (e.g., a threshold value of one indicating that more points are corrected than are disrupted). Additionally, or alternatively, this may be identified if the respective ratio of the bias-correcting iteration is greater than one (e.g., if more points are corrected than are disrupted). This can be useful for gating results where the system is not suffering from longitudinal bias or is only suffering from minor longitudinal bias.

At 1112, the method 1100 can include performing an operation for the autonomous vehicle based on the longitudinal bias. Once the longitudinal bias is identified, a variety of operations can be performed by the autonomous vehicle to correct for the longitudinal bias. As one example, the LIDAR system can be reconfigured or reset based on the longitudinal bias. For instance, a corrective filter can be applied to the LIDAR system's outputs to correct for the longitudinal bias. As another example, the LIDAR scan may be dropped or disregarded. As yet another example, the operation can be or can include one or more control operations associated with navigating the autonomous vehicle through its environment. The operation can be one of, for example, (i) determining a pose of the autonomous vehicle in the environment; (ii) determining a motion trajectory for the autonomous vehicle to navigate the environment; (iii) controlling a motion of the autonomous vehicle; or (iv) performing one or more autonomy operations for the autonomous vehicle.

In some implementations, such as in the case of an isolated LIDAR scan suffering from longitudinal bias, the autonomous vehicle may simply disregard or drop the LIDAR scan. For instance, in some implementations, performing the operation for the autonomous vehicle can include dropping the LIDAR scan. In some implementations, the LIDAR scan may be dropped only when the longitudinal bias is greater than some error margin.

Additionally or alternatively, in some implementations, the presence of longitudinal bias may also inform a reset or reboot of the LIDAR system and/or other portions of the autonomy system. For instance, in some implementations, performing the operation for the autonomous vehicle can include resetting at least a portion of the autonomy system. In some implementations, the portion of the autonomy system may be reset if the longitudinal bias is present over one or more prior LIDAR scans and the current LIDAR scan.

Additionally or alternatively, in some implementations, the shifted representation of the LIDAR scan from the best iteration can be used in place of the original, biased LIDAR scan. For instance, performing an operation for the autonomous vehicle can include providing the shifted representation of the LIDAR scan corresponding to the bias-correcting iteration in place of the LIDAR scan. The shifted representation of the LIDAR scan can include a plurality of shifted LIDAR points that are shifted by the offset of the bias-correcting iteration.

As yet another example, the operation can include controlling the autonomous vehicle based on a motion trajectory determined based on the longitudinal bias. As one example, a LIDAR scan that is corrected for longitudinal bias can be provided to the autonomy system, which can output a motion trajectory based on the LIDAR scan and other data available to the autonomy system.

The control system(s) can, for example, translate a motion trajectory into instructions for the appropriate platform control devices (e.g., acceleration control, brake control, steering control, etc.). By way of example, the control system(s) can translate a selected motion trajectory into instructions to adjust a steering component (e.g., a steering angle) by a certain number of degrees, apply a certain magnitude of braking force, increase/decrease speed, etc. In some implementations, the control system(s) can communicate with the platform control devices through communication channels including, for example, one or more data buses (e.g., controller area network (CAN), etc.), onboard diagnostics connectors (e.g., OBD-II, etc.), or a combination of wired or wireless communication links. The platform control devices can send or obtain data, messages, signals, etc. to or from the autonomy system(s) (or vice versa) through the communication channel(s).

As another example, the operation can include controlling the vehicle normally in light of a "false positive" longitudinal bias condition. The systems and methods according to example aspects of the present disclosure can correct for certain conditions that potentially contribute to a detection of a false longitudinal bias. Examples of false positive corrections are discussed with reference to FIGS. 14-16.

Figure 14:
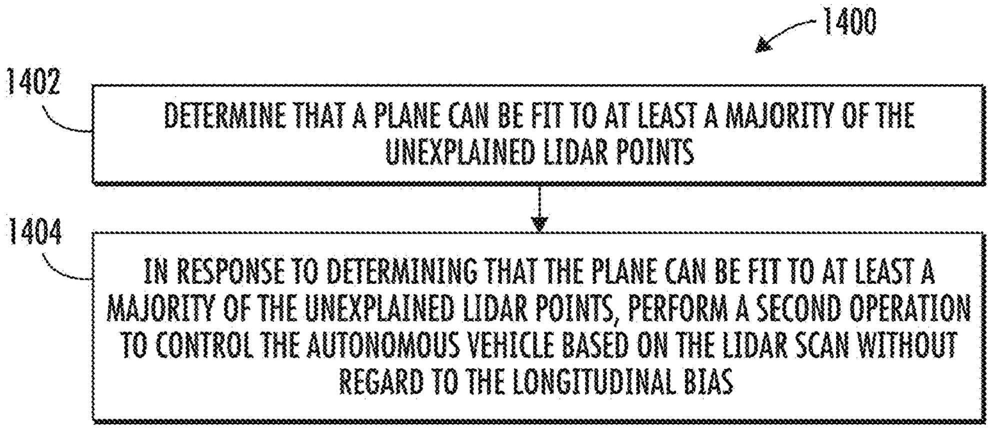

FIG. 14 depicts a method 1400 for correcting for a moved object condition. This condition may arise when a generally man-made object, such as a street sign, is moved in the environment relative to a pre-existing surfel map. This can occur, for example, if a street sign is knocked down and reinstalled at an offset, or if a construction sign is moved due to progress in construction, or in a similar condition. Because the object may generally be facing the same way, it will produce a number of unexplained points localized to the object's new locations and shift-explained points localized to the object's old location. The remainder of the environment, however, may have relatively few or no unexplained points.

To correct for this condition, the method 1400 can include, at 1402, determining that an object geometry can be fit to at least a majority of the unexplained LIDAR points. The object geometry may be simple geometry to save computational costs, such as, for example, a plane, or a relatively thin three-dimensional geometry approximating a surface. In response to determining that the object geometry can be fit to at least a majority of the unexplained LIDAR points, the method 1400 can include, at 1404, performing a second operation to control the autonomous vehicle based on the LIDAR scan without regard to the longitudinal bias. The second operation may be dependent on the original operation. For example, the second operation may be providing the original LIDAR scan instead of the shifted representation, or interrupting reset of the LIDAR system, etc. As one example, the object geometry may be fit to the LIDAR points by a RanSaC fitting.

As another example, a false positive condition may occur when train cars are represented in the surfel map. While one solution may be to exclude train cars from the surfel map, it is possible that some train cars, especially infrequently-moved train cars, may be represented in the surfel map despite efforts to exclude them. Because the train cars generally have parallel surfaces, movement and re-parking of the train cars, especially along the longitudinal direction, can look similar to longitudinal bias in LIDAR scans. The train cars, however, will generally fit into a consistent three-dimensional geometry offset along a fixed direction corresponding to the direction of the rails the train travels along. This principle can be utilized to correct for this condition.

Figure 15:
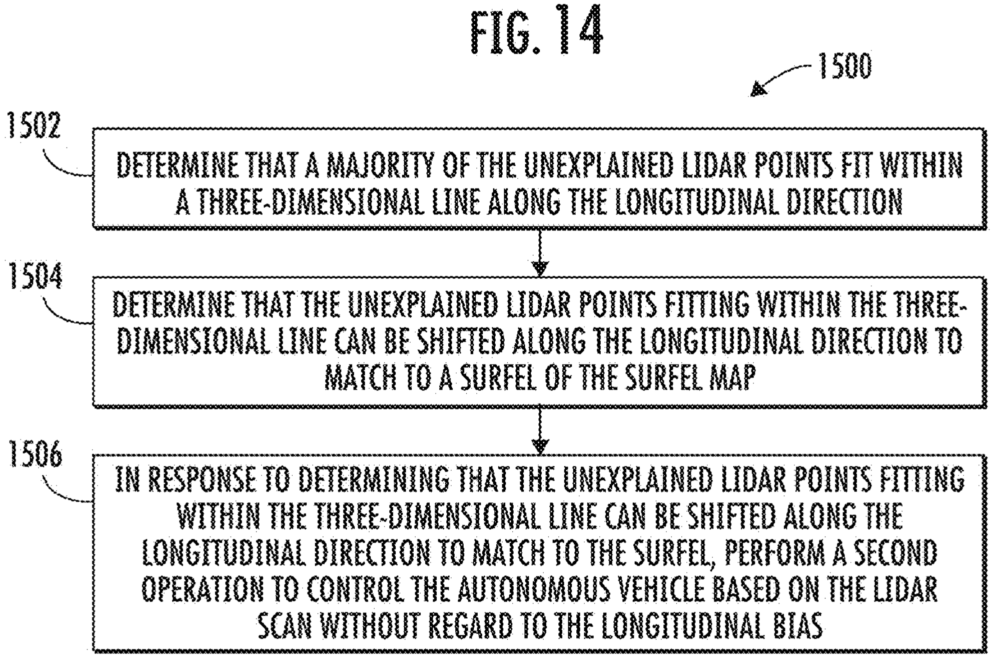
Figure 16:
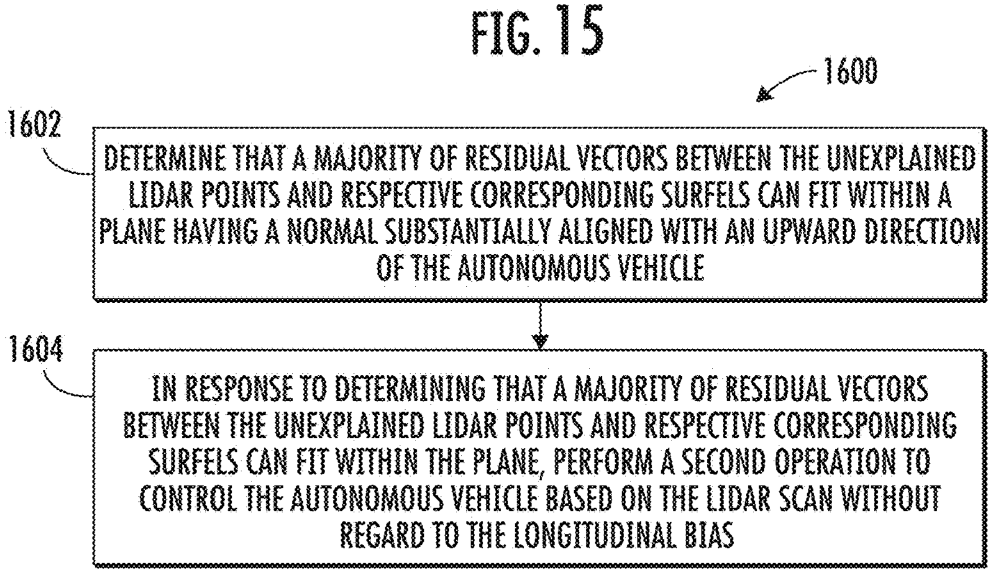

One example method 1500 for correcting this condition is illustrated in FIG. 15. The method 1500 can include, at 1502, determining that a majority of the unexplained LIDAR points fit within a three-dimensional line along a fitted direction. As used herein, a "three-dimensional line" is a primarily linear three-dimensional geometry that has a length along a given fitted direction, along with a width and height normal to the fitted direction. The length may be substantially greater than the width and height, such as about two times greater or about ten times greater than the width and height. Intuitively, when the points within the three-dimensional line can be shifted to match a surfel along that line, they are expected to shift to correspond to the original position of the train depicted in the surfel map. As one example, the three-dimensional line may be fit to the LIDAR points by a RanSaC fitting.

The method 1500 can include, at 1504, in response to determining that the unexplained LIDAR points fitting within the three-dimensional line can be shifted along the fitted direction to match to the surfel, performing a second operation to control the autonomous vehicle based on the LIDAR scan without regard to the longitudinal bias. The second operation may be dependent on the original operation. For example, the second operation may be providing the original LIDAR scan instead of the shifted representation, or interrupting reset of the LIDAR system, etc. As one example, the object geometry may be fit to the LIDAR points by a RanSaC fitting.

As another example, a false positive condition can occur when an uneven substantially horizontal surface (e.g., the ground) produces a significant number of unexplained LIDAR points corresponding to minor variations in the surface, such as, for example, grass blades flowing on the ground, vegetation changes, etc. Weighting the respective ratio by verticality can somewhat mitigate this problem, but when the residual vectors are sufficiently random due to small or unpredictable feature changes some may occur that are substantially vertical and consequently survive the weighting attempts. One example method 1600 for correcting this false positive condition is described with respect to FIG. 16.

At 1602, the method 1600 can include determining that a majority of residual vectors between the unexplained LIDAR points and respective corresponding surfels can fit within a plane having a normal substantially aligned with an upward direction of the autonomous vehicle. For instance, the plane may be substantially horizonal. As used herein, the residual vectors "fit within" a plane if they are generally contained in a region including the plane and a slight distance above or below the plane (e.g., a three-dimensional structure substantially defined by the plane). As one example, the plane may be fit to the LIDAR points by a RanSaC fitting.

At 1604, the method 1600 can include, in response to determining that a majority of residual vectors between the unexplained LIDAR points and respective corresponding surfels can fit within the plane having the normal substantially aligned with the upward direction of the autonomous vehicle, performing a second operation to control the autonomous vehicle based on the LIDAR scan without regard to the longitudinal bias. The second operation may be dependent on the original operation. For example, the second operation may be providing the original LIDAR scan instead of the shifted representation, or interrupting reset of the LIDAR system, etc. As one example, the object geometry may be fit to the LIDAR points by a RanSaC fitting.

Figure 17:
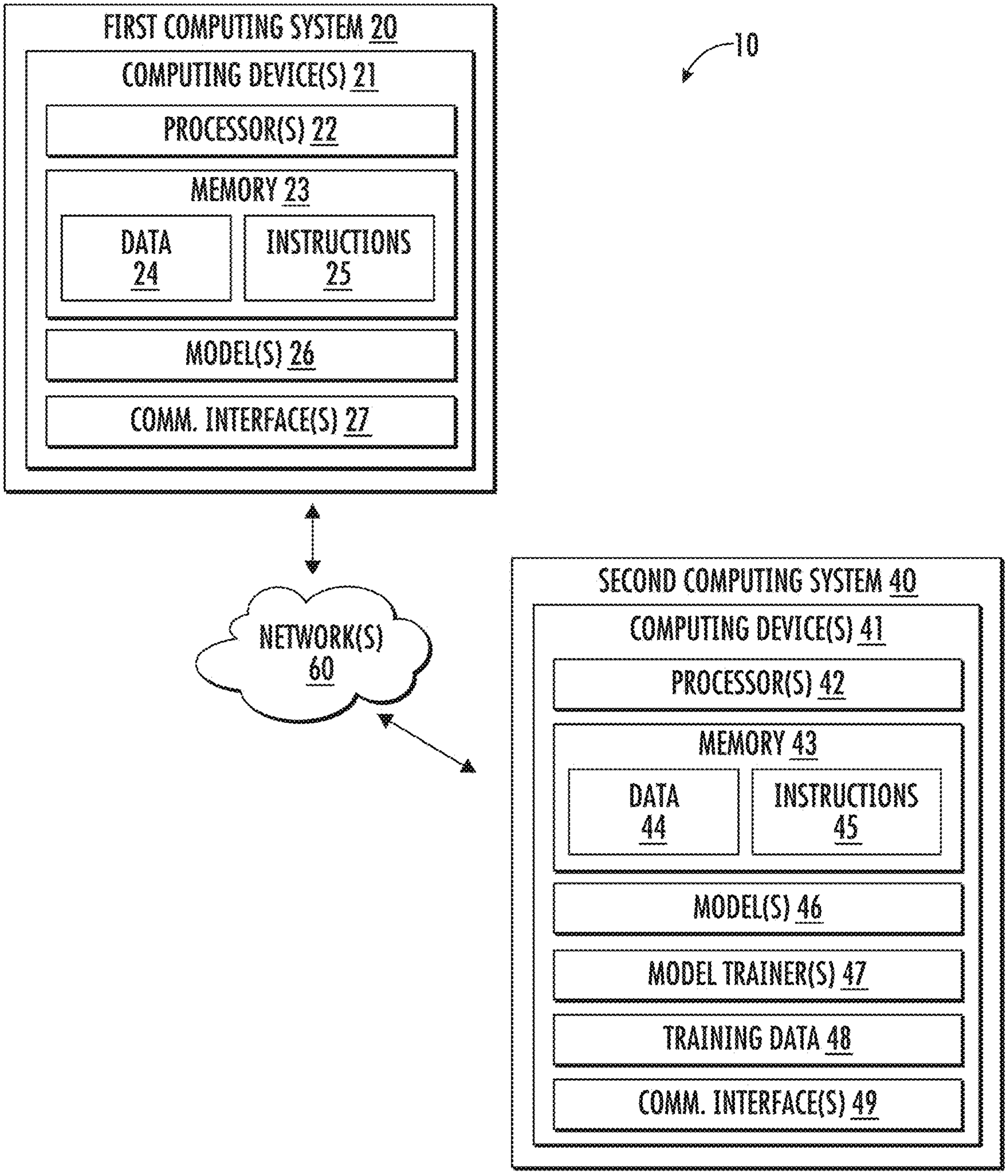
FIG. 17 is a block diagram of an example computing system for localizing an autonomous vehicle, according to some implementations of the present disclosure.

FIG. 17 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for localizing an autonomous vehicle.

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 17 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 can not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A computer-implemented method for detecting a longitudinal bias in an autonomy system of an autonomous vehicle, the method comprising:

(a) obtaining a LIDAR scan comprising a plurality of LIDAR points, the LIDAR scan descriptive of an environment of the autonomous vehicle;

(b) obtaining a surfel map descriptive of the environment of the autonomous vehicle, the surfel map comprising a plurality of surfels;

(c) classifying each of the plurality of LIDAR points as an explained LIDAR point or an unexplained LIDAR point based on an alignment of the LIDAR scan to the surfel map, wherein an explained LIDAR point is a LIDAR point that matches a surfel in the surfel map;

(d) shifting the LIDAR scan along a longitudinal direction for a plurality of iterations, each iteration of the plurality of iterations comprising:

(i) determining a shifted representation of the LIDAR scan;

(ii) determining a first quantity of shift-explained points, wherein a shift-explained point is an unexplained LIDAR point from (c) that matches a surfel in the surfel map in the shifted representation in (d)(i); and (iii) determining a second quantity of shift-unexplained points, wherein a shift-unexplained point is an explained LIDAR point from (c) that does not match a surfel in the surfel map in the shifted representation in (d)(i);

(e) determining the longitudinal bias by comparing the first quantity to the second quantity for each of the plurality of iterations; and (f) performing an operation for the autonomous vehicle based on the longitudinal bias.

2. The computer-implemented method of claim 1, wherein the surfel map is populated based on one or more prior LIDAR scans captured by the autonomous vehicle.

3. The computer-implemented method of claim 1, wherein (c) comprises:

(i) executing an algorithm that determines the alignment of the LIDAR scan to the surfel map; and (ii) classifying a LIDAR point as an explained LIDAR point if the algorithm is successful in matching the LIDAR point to a surfel or classifying the LIDAR point as an unexplained LIDAR point if the algorithm is not successful in matching the LIDAR point to a surfel.

4. The computer-implemented method of claim 1, wherein (e) comprises identifying a bias-correcting iteration of the plurality of iterations based on a plurality of respective weights of the first quantity of shift-explained points against the second quantity of shift-unexplained points respective to each iteration of the plurality of iterations.

5. The computer-implemented method of claim 4, wherein (e) comprises:

(i) determining an iteration of the plurality of iterations having a highest weight of the plurality of respective weights; and (ii) identifying the iteration of the plurality of iterations having the highest weight of the plurality of respective weights as the bias-correcting iteration.

6. The computer-implemented method of claim 4, wherein performing the operation for the autonomous vehicle comprises dropping the LIDAR scan.

7. The computer-implemented method of claim 4, wherein performing the operation for the autonomous vehicle comprises resetting at least a portion of the autonomy system.

8. The computer-implemented method of claim 4, wherein:

the LIDAR scan is shifted by an offset for each iteration of the plurality of iterations; and performing an operation for the autonomous vehicle comprises providing the shifted representation of the LIDAR scan corresponding to the bias-correcting iteration in place of the LIDAR scan, the shifted representation of the LIDAR scan comprising a plurality of shifted LIDAR points that are shifted by the offset of the bias-correcting iteration.

9. The computer-implemented method of claim 4, wherein the shift-explained points are weighted based on verticality of a closest corresponding surfel respective to the shift-explained points, wherein the verticality of the closest corresponding surfel comprises a similarity between the longitudinal direction and a normal of the closest corresponding surfel.

10. The computer-implemented method of claim 1, further comprising:

(g) determining that a plane can be fit to at least a majority of the unexplained LIDAR points; and (h) in response to determining that the plane can be fit to at least a majority of the unexplained LIDAR points, performing a second operation to control the autonomous vehicle based on the LIDAR scan without regard to the longitudinal bias.

11. The computer-implemented method of claim 1, further comprising:

(g) determining that a majority of the unexplained LIDAR points fit within a line along a fitted direction, the line comprising a length that is substantially greater than a width and a height of the line;

(h) determining that the unexplained LIDAR points fitting within the line can be shifted along the fitted direction to match to a surfel of the surfel map; and (i) in response to determining that the unexplained LIDAR points fitting within the line can be shifted along the fitted direction to match to the surfel, performing a second operation to control the autonomous vehicle based on the LIDAR scan without regard to the longitudinal bias.

12. The computer-implemented method of claim 1, further comprising:

(g) determining that a majority of residual vectors between the unexplained LIDAR points and respective corresponding surfels can fit within a plane having a normal substantially aligned with an upward direction of the autonomous vehicle; and (h) in response to determining that a majority of residual vectors between the unexplained LIDAR points and respective corresponding surfels can fit within the plane having the normal substantially aligned with the upward direction of the autonomous vehicle, performing a second operation to control the autonomous vehicle based on the LIDAR scan without regard to the longitudinal bias.

13. The computer-implemented method of claim 1, wherein the operation for the autonomous vehicle comprises at least one of: (i) determining a pose of the autonomous vehicle in the environment; (ii) determining a motion trajectory for the autonomous vehicle to navigate the environment; (iii) controlling a motion of the autonomous vehicle; or (iv) performing one or more autonomy operations for the autonomous vehicle.

14. An autonomous vehicle (AV) control system, comprising:

a LIDAR system configured to provide LIDAR scans;

one or more processors; and one or more non-transitory, computer-readable media storing instructions that, when implemented, cause the one or more processors to perform operations, the operations comprising:

(a) obtaining a LIDAR scan comprising a plurality of LIDAR points, the LIDAR scan descriptive of an environment of an autonomous vehicle;

(b) obtaining a surfel map descriptive of the environment of the autonomous vehicle, the surfel map comprising a plurality of surfels;

(c) classifying each of the plurality of LIDAR points as an explained LIDAR point or an unexplained LIDAR point based on an alignment of the LIDAR scan to the surfel map, wherein an explained LIDAR point is a LIDAR point that matches a surfel in the surfel map;

(d) shifting the LIDAR scan along a longitudinal direction for a plurality of iterations, each iteration of the plurality of iterations comprising:

(i) determining a shifted representation of the LIDAR scan;

(ii) determining a first quantity of shift-explained points, wherein a shift-explained point is an unexplained LIDAR point from (c) that matches a surfel in the surfel map in the shifted representation in (d)(i); and (iii) determining a second quantity of shift-unexplained points, wherein a shift-unexplained point is an explained LIDAR point from (c) that does not match a surfel in the surfel map in the shifted representation in (d)(i);

(e) determining a longitudinal bias in the LIDAR system by comparing the first quantity to the second quantity for each of the plurality of iterations; and (f) performing an operation for the autonomous vehicle based on the longitudinal bias.

15. The AV control system of claim 14, wherein (c) comprises:

(i) executing an algorithm that determines the alignment of the LIDAR scan to the surfel map; and (ii) classifying a LIDAR point as an explained LIDAR point if the algorithm is successful in matching the LIDAR point to a surfel or classifying the LIDAR point as an unexplained LIDAR point if the algorithm is not successful in matching the LIDAR point to a surfel.

16. The AV control system of claim 14, wherein (e) comprises identifying a bias-correcting iteration of the plurality of iterations based on a plurality of respective weights of the first quantity of shift-explained points against the second quantity of shift-unexplained points respective to each iteration of the plurality of iterations.

17. The AV control system of claim 16, wherein:

the LIDAR scan is shifted by an offset for each iteration of the plurality of iterations;

performing an operation for the autonomous vehicle comprises determining that the respective weight of the bias-correcting iteration is greater than a threshold; and the operations comprise, in response to determining that the respective weight of the bias-correcting iteration is greater than the threshold, providing the shifted representation of the LIDAR scan corresponding to the bias-correcting iteration in place of the LIDAR scan, the shifted representation of the LIDAR scan comprising a plurality of shifted LIDAR points that are shifted by the offset of the bias-correcting iteration.

18. The AV control system of claim 16, wherein the shift-explained points are weighted based on verticality of a closest corresponding surfel respective to the shift-explained points, wherein the verticality of the closest corresponding surfel comprises a similarity between the longitudinal direction and a normal of the closest corresponding surfel.

19. An autonomous vehicle, comprising:

a LIDAR system configured to provide LIDAR scans;

one or more processors; and one or more non-transitory, computer-readable media storing instructions that, when implemented, cause the one or more processors to perform operations, the operations comprising:

(a) obtaining a LIDAR scan comprising a plurality of LIDAR points, the LIDAR scan descriptive of an environment of the autonomous vehicle;

(b) obtaining a surfel map descriptive of the environment of the autonomous vehicle, the surfel map comprising a plurality of surfels (c) classifying each of the plurality of LIDAR points as an explained LIDAR point or an unexplained LIDAR point based on an alignment of the LIDAR scan to the surfel map, wherein an explained LIDAR point is a LIDAR point that matches a surfel in the surfel map;

(d) shifting the LIDAR scan along a longitudinal direction for a plurality of iterations, each iteration of the plurality of iterations comprising:

(i) determining a shifted representation of the LIDAR scan;

(ii) determining a first quantity of shift-explained points, wherein a shift-explained point is an unexplained LIDAR point from (c) that matches a surfel in the surfel map in the shifted representation in (d)(i); and (iii) determining a second quantity of shift-unexplained points, wherein a shift-unexplained point is an explained LIDAR point from (c) that does not match a surfel in the surfel map in the shifted representation in (d)(i);

(e) determining longitudinal bias in the LIDAR system by comparing the first quantity to the second quantity for each of the plurality of iterations; and (f) performing an operation for the autonomous vehicle based on the longitudinal bias.

20. The autonomous vehicle of claim 19, wherein (e) comprises identifying a bias-correcting iteration of the plurality of iterations based on a plurality of respective weights of the first quantity of shift-explained points to the second quantity of shift-unexplained points respective to each iteration of the plurality of iterations.

* * * * *